United States Patent [19]
Cary

[11] 4,064,648
[45] Dec. 27, 1977

[54] WEATHER RESPONSIVE INSULATION SYSTEM FOR GREENHOUSES AND THE LIKE

[75] Inventor: Charles C. Cary, Cambridge, Mass.

[73] Assignee: Roll-Out Insulation Systems, Inc., Cambridge, Mass.

[21] Appl. No.: 660,767

[22] Filed: Feb. 23, 1976

[51] Int. Cl.² .......................... A01G 9/00; A01G 9/24
[52] U.S. Cl. ........................................ 47/17; 16/87 R; 49/332; 52/173 R; 98/42 A; 160/1; 160/4; 165/1; 200/61.07; 242/62; 254/183; 340/282
[58] Field of Search ................ 47/17; 242/64, 67, 68, 242/68.7, 73.5, 75.3, 75.41, 76, 78.7, 84.2 C, 85, 86.6; 49/332, 347, 352, 496; 98/31, 32, 96, 105, DIG. 7, 54; 50/477; 285/325 X; 52/1, 64, 173, 2, 22, 83, 235, 245, 393, 404, 405, 406; 160/184, 126, 109, 111, 120, 126, 237, 248, 287, 265, 310, 238, 318, 391, 4, 5; 200/61.06, 61.07, 61.2, 61.21, 252; 340/234, 282; 254/183

[56] References Cited

U.S. PATENT DOCUMENTS

| | | | |
|---|---|---|---|
| 1,056,120 | 3/1913 | Poindexter | 254/183 X |
| 1,100,598 | 6/1914 | McLaren et al. | 47/17 X |
| 1,284,978 | 11/1918 | Axe | 160/318 |
| 1,718,215 | 6/1929 | Burrage | 47/17 |
| 2,046,600 | 7/1936 | Atkinson | 47/17 |
| 2,182,852 | 12/1939 | Mulford | 52/22 |
| 2,193,921 | 3/1940 | Gibbons | 47/17 |
| 2,220,311 | 11/1940 | Anton | 242/73.5 |
| 2,248,414 | 7/1941 | Schane | 242/73.5 |
| 2,660,659 | 11/1953 | Sarno | 160/238 |
| 2,787,695 | 4/1957 | Dyke | 340/234 X |
| 2,922,183 | 1/1960 | Taylor | 16/87 R |
| 3,140,857 | 7/1964 | Nickles | 254/144 |
| 3,193,637 | 7/1965 | Russell | 200/61.06 |
| 3,309,473 | 3/1967 | Heinrich | 200/61.07 |
| 3,315,727 | 4/1967 | Clark | 52/22 X |
| 3,418,752 | 12/1968 | Stratton | 47/28 |
| 3,450,192 | 6/1969 | Hay | 165/1 |
| 3,460,602 | 8/1969 | Hugus | 160/265 |
| 3,481,073 | 12/1969 | Yoshida et al. | 47/17 |
| 3,493,032 | 2/1970 | Brown, Jr. et al. | 16/87 R |
| 3,568,588 | 3/1971 | Kudeck | 98/54 |
| 3,581,884 | 6/1971 | Caldwell | 49/496 X |
| 3,656,782 | 3/1972 | Molino | 285/325 X |
| 3,765,134 | 10/1973 | Gilchrist | 47/17 X |
| 3,791,076 | 2/1974 | Gahler | 47/17 X |
| 3,900,063 | 8/1975 | Roller | 160/310 |

FOREIGN PATENT DOCUMENTS

| | | | |
|---|---|---|---|
| 563,865 | 3/1923 | France | 47/17 |
| 1,211,764 | 4/1902 | France | 47/17 |
| 172,275 | 3/1905 | Germany | 47/17 |
| 408,463 | 1/1925 | Germany | 47/17 |
| 2,363,825 | 12/1973 | Germany | 52/404 |
| 1,911,301 | 6/1969 | Germany | 47/17 |
| 1,952,639 | 5/1971 | Germany | 47/17 |
| 645,306 | 5/1948 | United Kingdom | 160/391 |
| 1,113,577 | 5/1968 | United Kingdom | 47/17 |
| 1,385,261 | 2/1975 | United Kingdom | 47/17 |

Primary Examiner—E. H. Eickholt
Assistant Examiner—James R. Feyrer

[57] ABSTRACT

An insulating system for reducing heat loss from a structure during one part of the day and for permitting light to enter the structure during another part of the day, this system comprising a roll mounted on the structure, a flexible sheet of material wound around the roll, structure supporting the roll immediate its length and engaging portions of the wound sheet, and means for unwinding the sheet from around the roll and deploying it in a plane and for rotating the roll to rewind the sheet therearound; and a system for detecting build-up of snow or ice.

10 Claims, 32 Drawing Figures

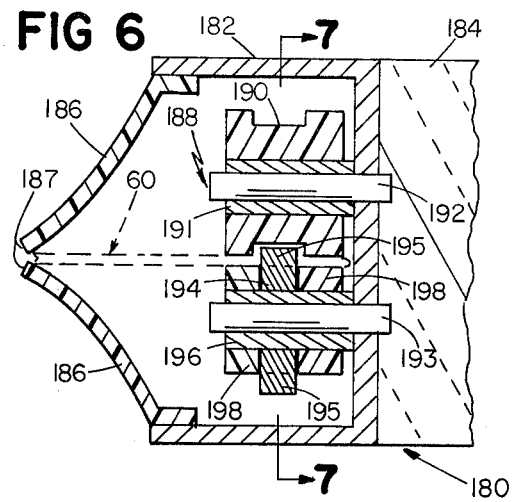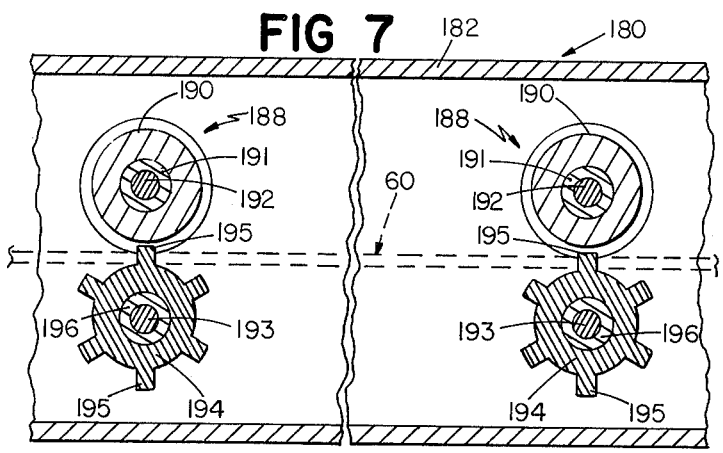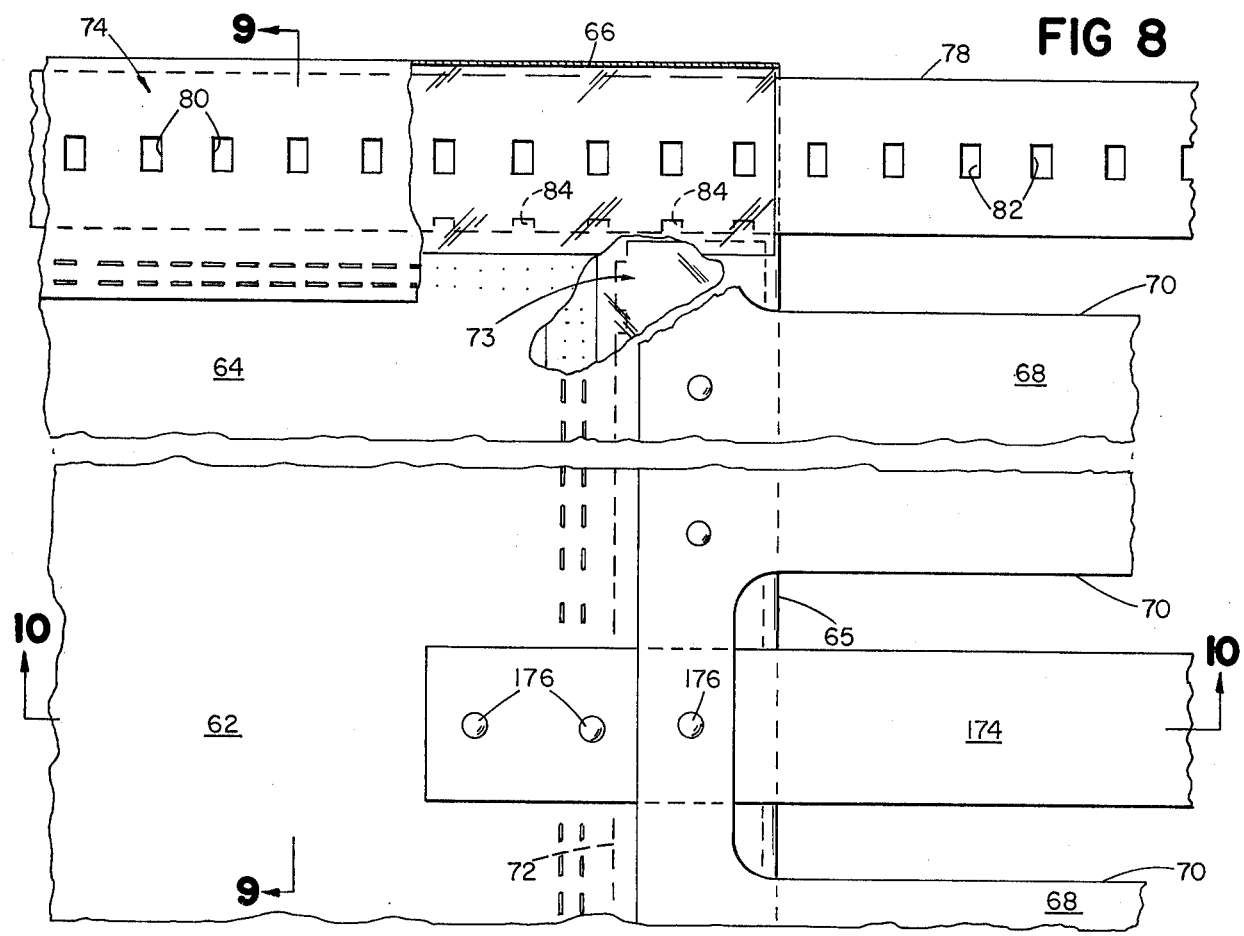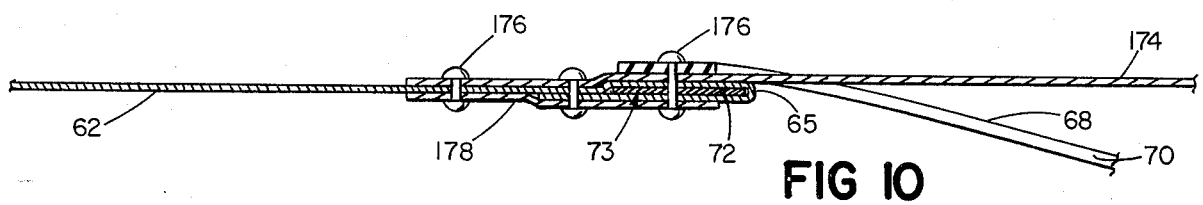

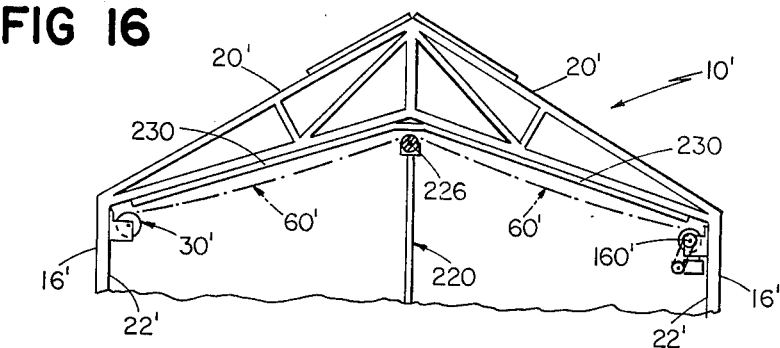
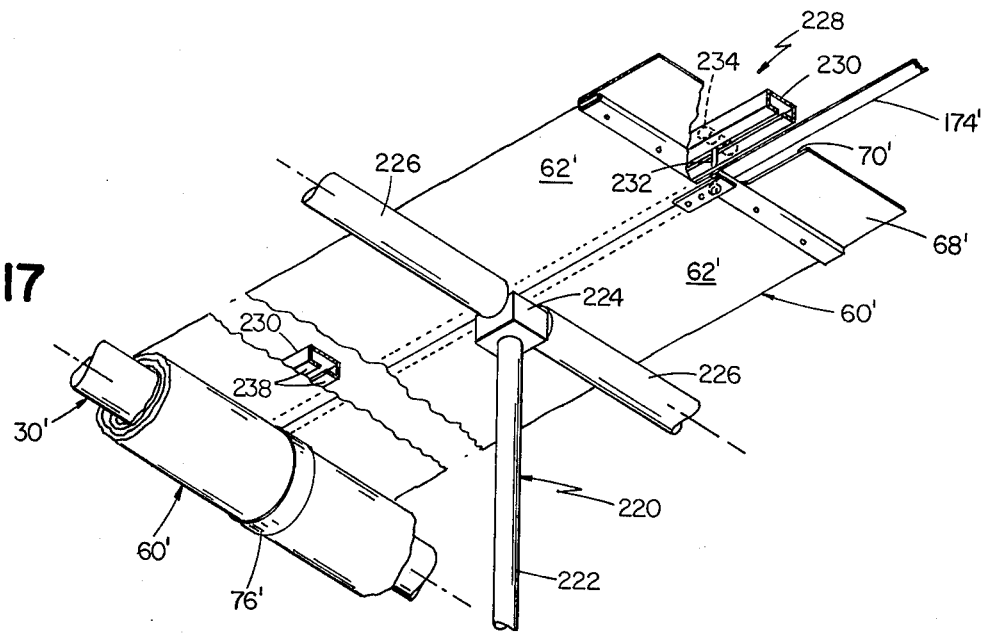
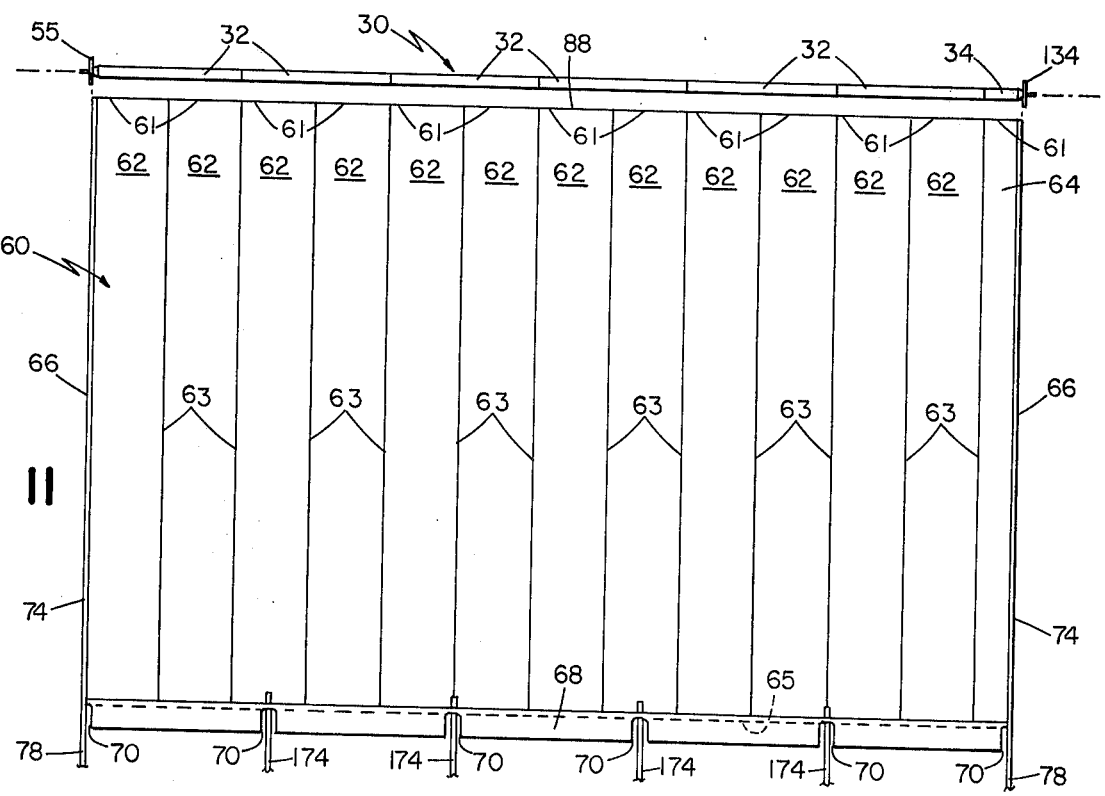

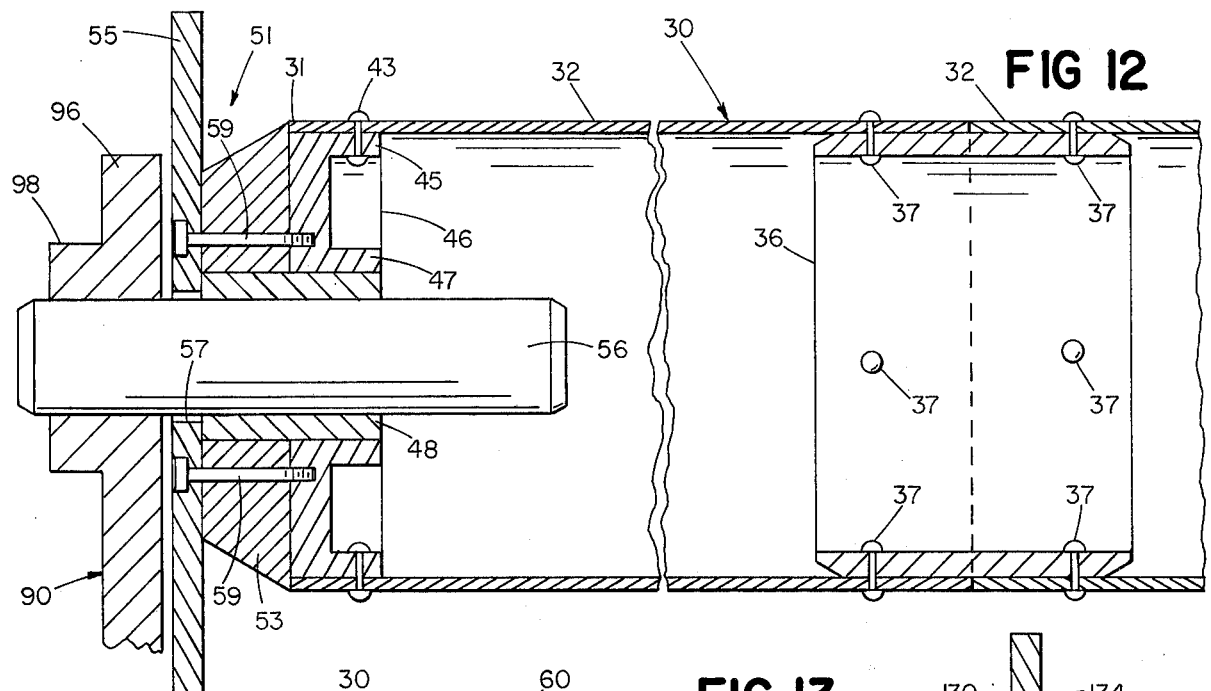
FIG 12
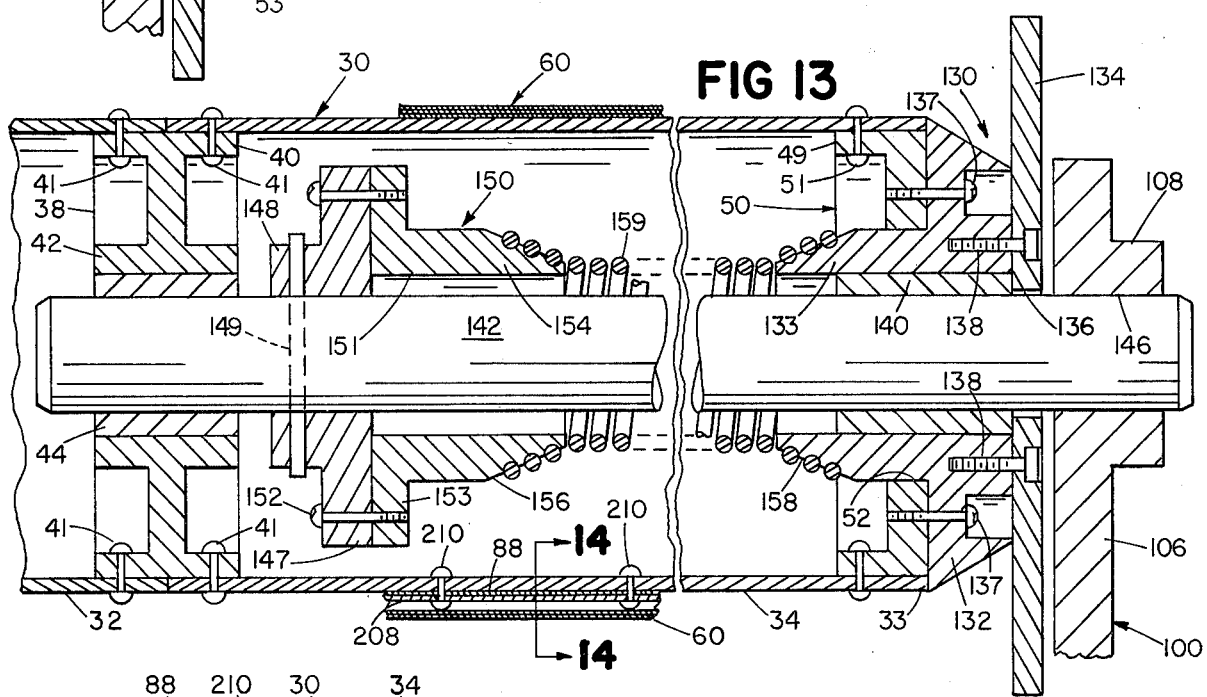
FIG 13
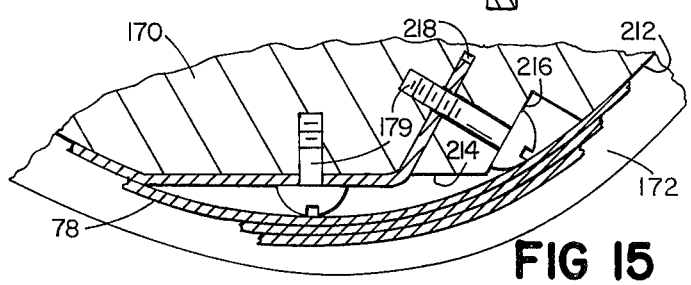
FIG 14
FIG 15

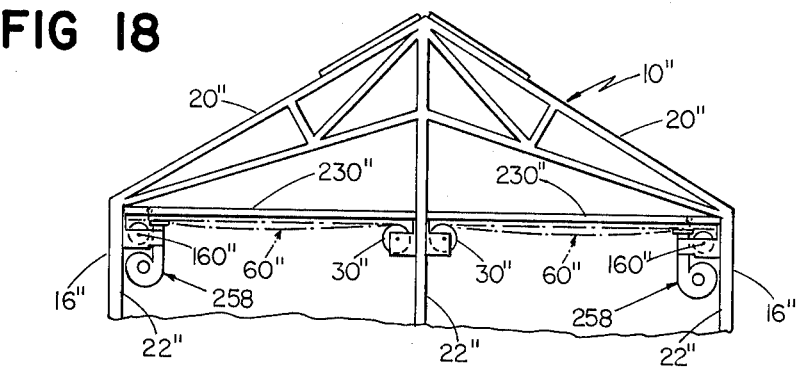
FIG 18
FIG 13a
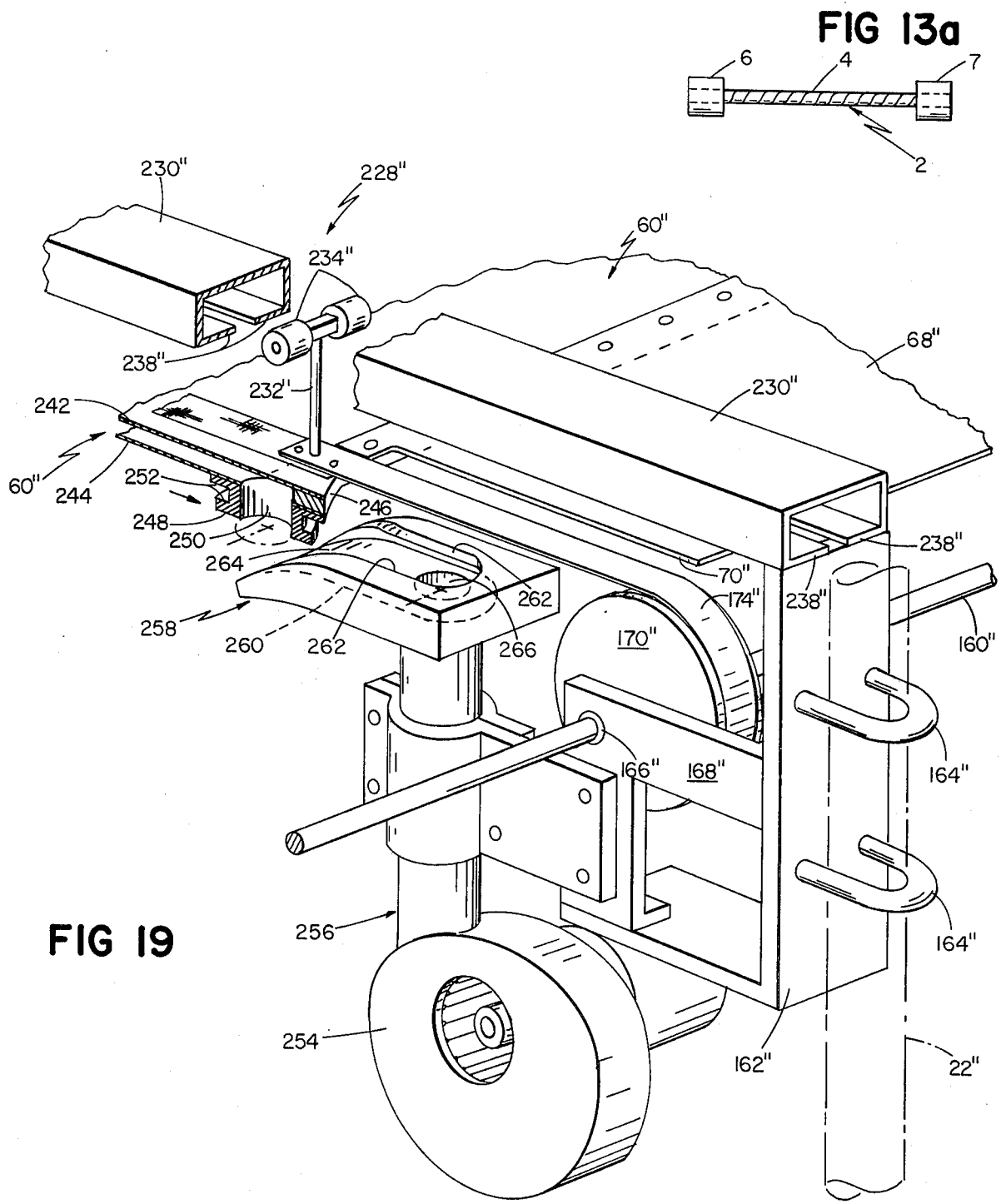
FIG 19

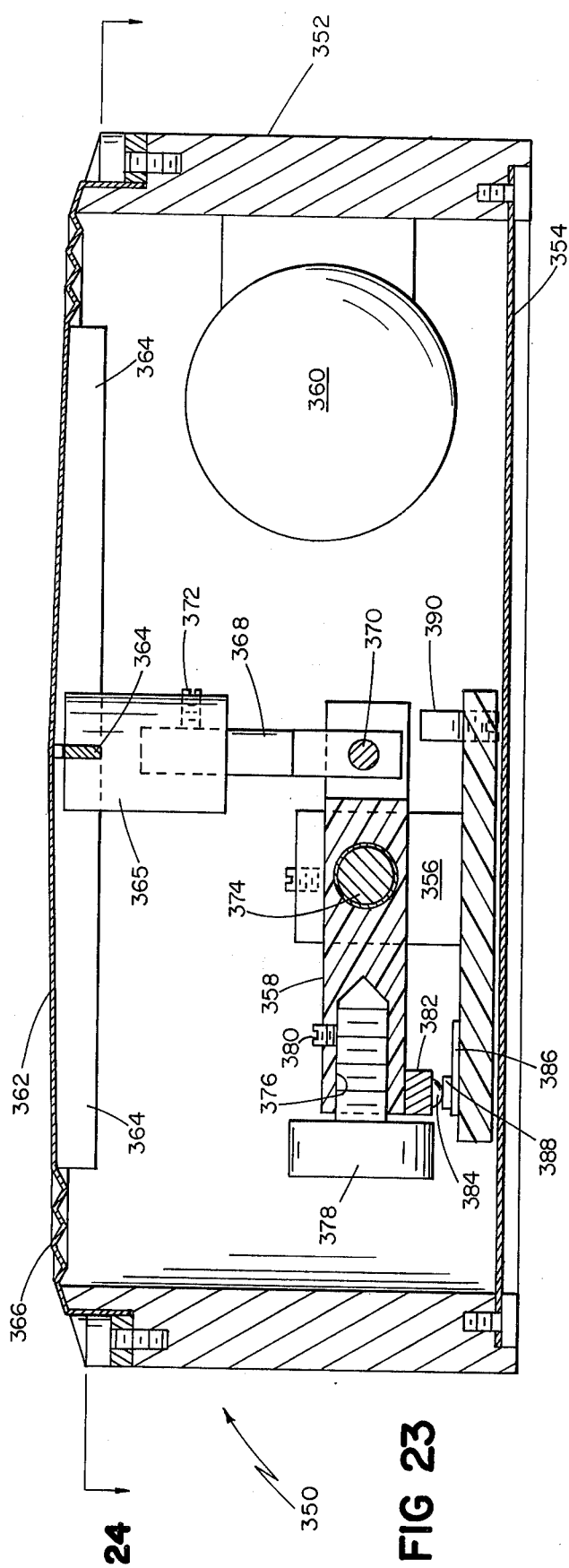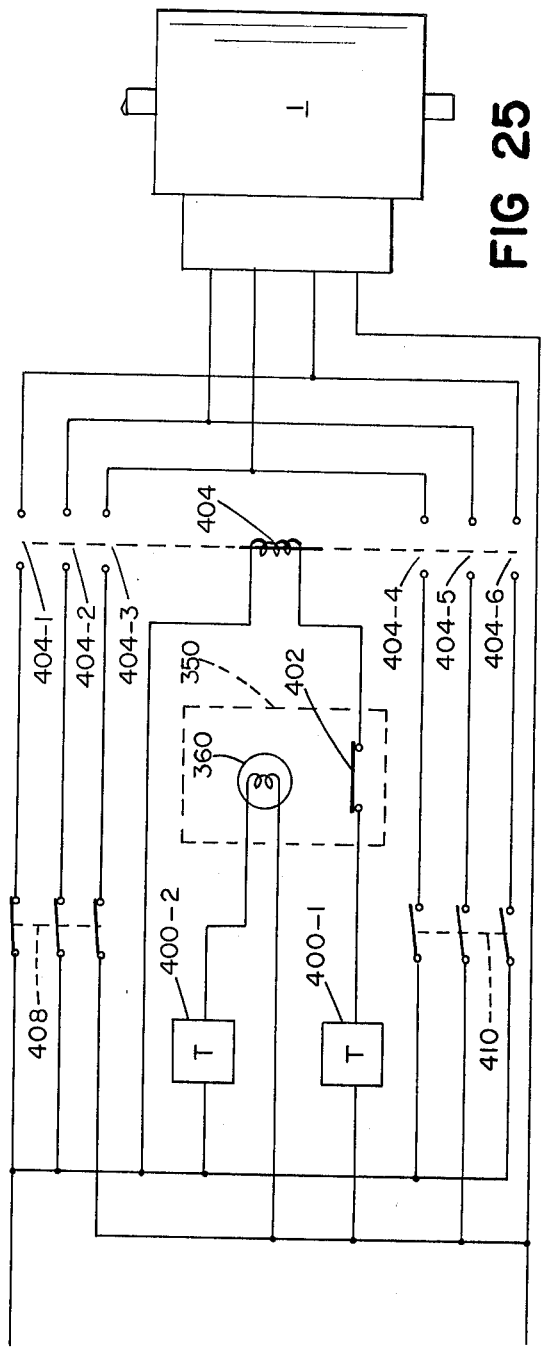
FIG 23
FIG 25

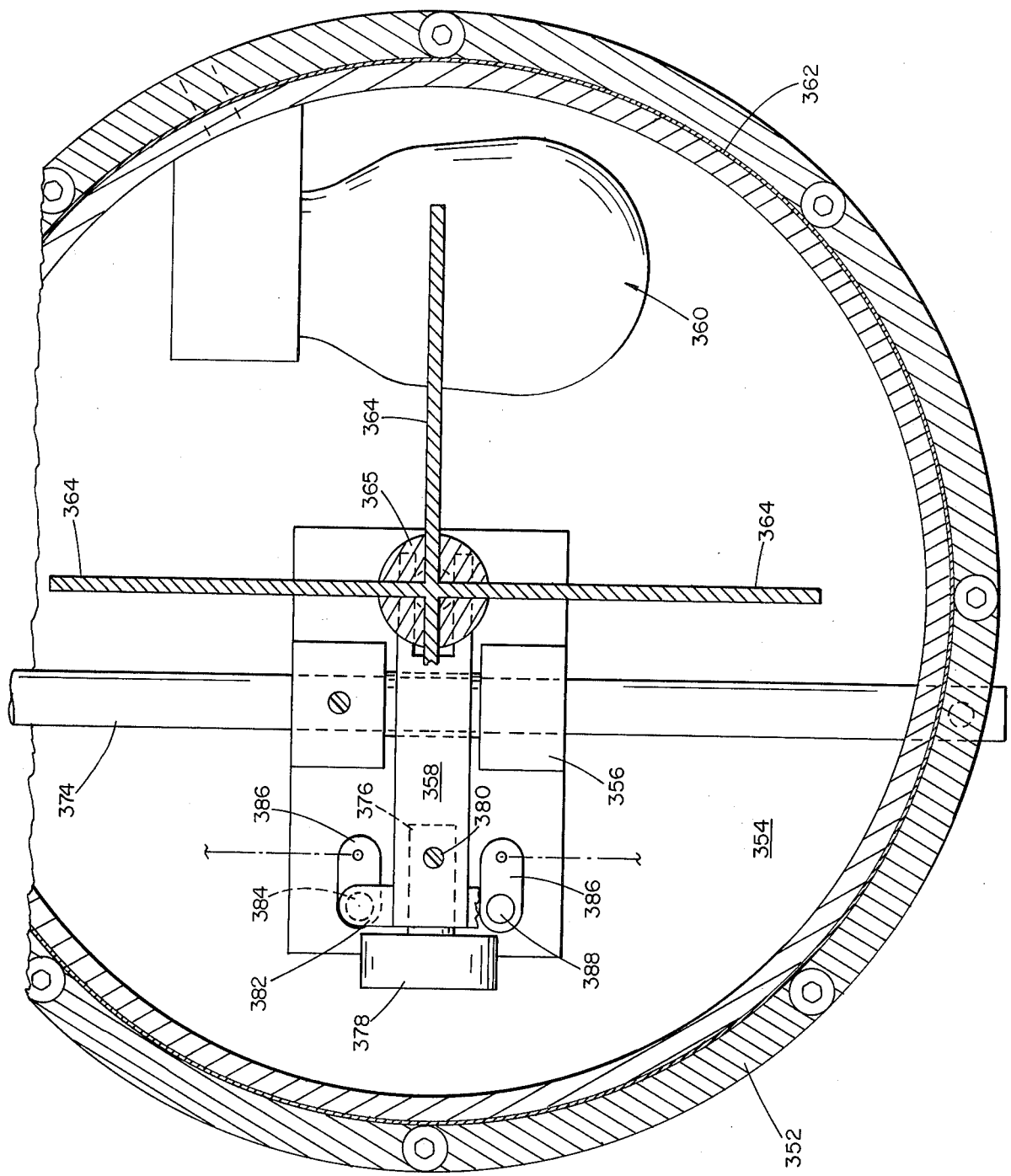
FIG 24

WEATHER RESPONSIVE INSULATION SYSTEM FOR GREENHOUSES AND THE LIKE

This invention relates to insulating systems, and, more particularly, to systems for insulating large glass exterior walls, such as the roofs and walls of greenhouses.

There are in the United States commercial greenhouses totaling over 225 million square feet. Over two-thirds of this total is in the Northern United States, where greenhouses must be heated during at least some of the year. The greenhouse heating cost exceeds $115 million annually.

Most of the fuel used to heat greenhouses is expended at night. The best estimates seem to be that night-time heating accounts for as much as 80% of the total heating bill. Recent increases in fuel cost, coupled with severe shortages of fuels such as natural gas, have faced greenhouse owners with a major problem. They must cut their total fuel consumption drastically if they wish to remain competatively viable.

One way to cut fuel consumption is to reduce the heat loss through the greenhouse walls and roof, especially at night. Insulating the walls or roof can significantly reduce heating requirements, but itself presents several potentially serious problems. First, an insulating system should not significantly reduce the amount of sunlight that can enter the house during the day. Second, insulating will permit the temperature of the greenhouse roof to drop below freezing, permitting heavy snow or ice to build up on the roof. Third, the insulating system may take up valuable growing space within the greenhouse. Finally, an insulating system should be readily adaptable for use with greenhouses of widely varying size and construction, and should cover a large area rather than requiring many small systems installed between each pair of obstructing greenhouse supports.

It is a primary object of one aspect of the present invention to provide an insulating system, especially suited for large glass surfaces such as greenhouse roofs, which will reduce night-time heat loss by as much as 50% to 85% but which at the same time is retractable to permit sunlight to enter the structure in the usual manner during the day. A principle object of a second aspect is to provide a detection system for preventing dangerous and destructive build-up of snow or ice on insulated greenhouse roofs. Other objects, incorporating one or both aspects, include providing such insulating and detection systems which are relatively inexpensive to construct and install, and which can be installed in greenhouses of widely varying size, shape, and structural design, and insulating systems which do not signficantly reduce the height of the plants which can be grown within the greenhouse and in which the tension on the insulating material used in the system is uniform.

The first aspect of the invention features an insulating system for preventing heat loss from a structure through a plane during one portion of a day and for permitting light to enter the structure during a second part of the day, the system comprising a roll mounted adjacent the plane with the central axis of the roll extending generally parallel to the plane, a flexible sheet of insulating material of length substantially equal to the length of the roll and of width several times greater than the circumference of the roll secured to and wound around the exterior of the roll, roll support means supporting the roll for rotation in both directions about its central axis and including at least one roll support structure intermediate the length of the roll and engaging portions of the sheet wound about the exterior of the roll, deploying means for unwinding the sheet from around the roll and deploying the sheet in an insulating position in which insulating material is unwound from the roll and deployed in the plane and retracting means for rotating the roll to move the sheet from the insulating position and to wind the fabric around the roll.

The second aspect of the invention features, for use with an insulating system having a first configuration in which the system permits the temperature of the roof of a structure to drop below 0° C. and a second configuration in which the system insures the temperature of the roof can be maintained above 0° C., a snow/ice detection system including a horizontal build-up surface of predetermined area mounted for movement between a first and second positions, bias means for exerting a predetermined force biasing the surface towards its first position whereby the surface remains in the first position until the load thereon exceeds the predetermined force and thereupon moves into its second position, a control system including switching means responsive to movement of the build-up surface from its position and adapted for connection to the insulating systems for causing the insulating system to move from its first configuration to its second configuration in response to movement of the build-up surface from its first position to its second position.

Preferred embodiments, including both aspects of the invention and in which the roll extends substantially the full length of a greenhouse and in which when the sheet is in its insulating position the sheet extends across the greenhouse and the sides of the sheet are sealed to the greenhouse end walls, feature a roll comprising a plurality of roll segments connected end-to-end, a biasing system exerting rotational torque on the roll in the direction tending to wind the sheet material onto the roll, a plurality of support structures each including at least three support rollers spaced about the periphery of the roll and a support band entrained around the support rollers and engaging the fabric wrapped around the roll, deploying means including a main cable extending from a take-up to a block at the leading edge of the sheet and thence along the front edge and secondary cables extending from the take-ups to the leading edge of the sheet and there connected to the main cable, a detection system wherein the horizontal build-up surface is circular and fixed at its periphery, switching neans including a balance beam comprising a normally closed switch and having one end thereof connected to the center of the circular horizontal surface and switch contacts mounted on the other end thereof, a control system connected to the motor and operative for actuating the retracting means in response to movement of the balance beam to open the normally closed switch, and, in some embodiments, a sheet arranged for vertical deployment or a multi-layer inflatable sheet.

Other objects, features and advantages will appear from the following detailed description of preferred embodiments of the invention, taken together with the attached drawings in which:

FIG. 6 is a plan sectional view taken at line 6—6 of FIG. 2;

FIG. 7 is a plan sectional view taken at line 7—7 of FIG. 6;

FIG. 8 is a plan view of portions of the insulating system of FIG. 1;

Figure 1:
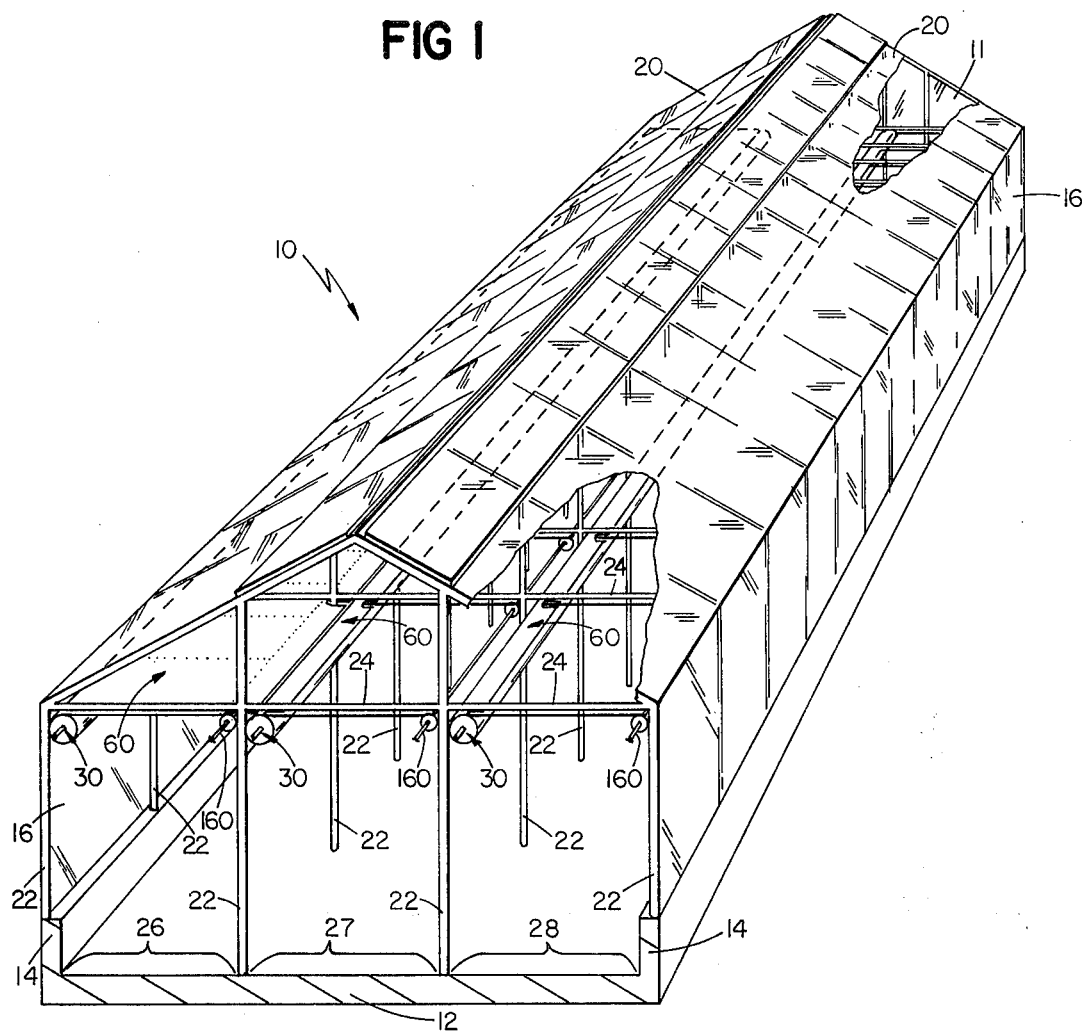
FIG. 1 is a perspective view, partially in section, of a greenhouse including an insulating system embodying the present invention.
Figure 21:
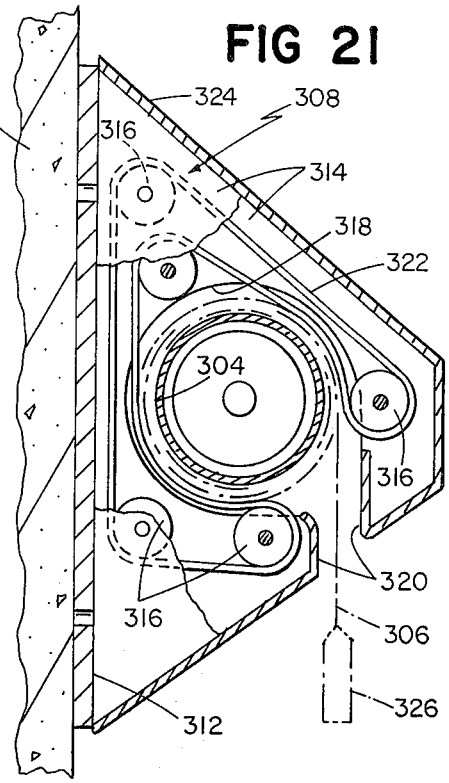
Figure 22:
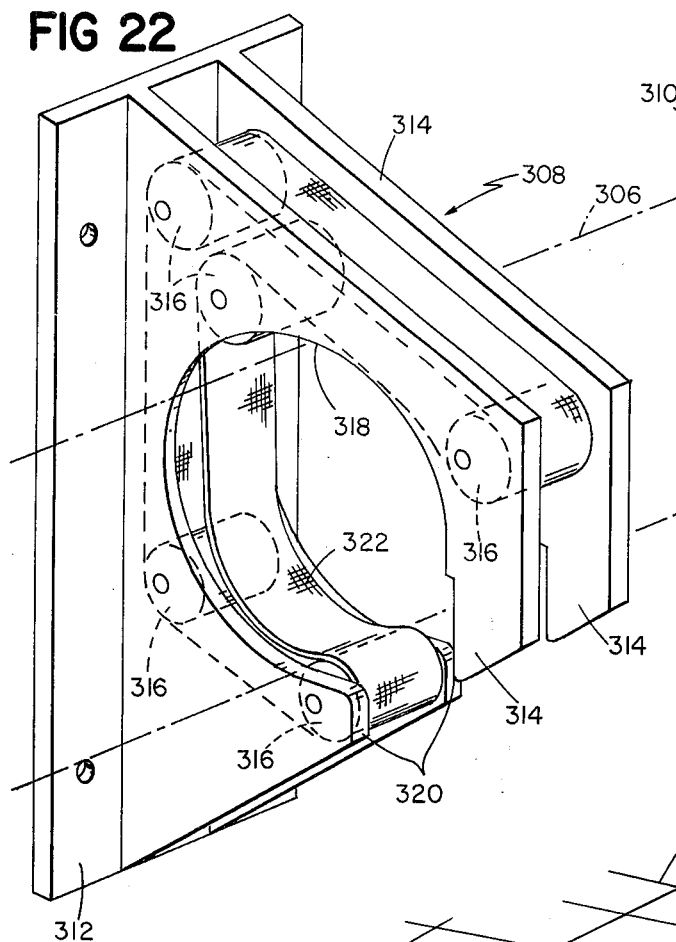
Figure 20:
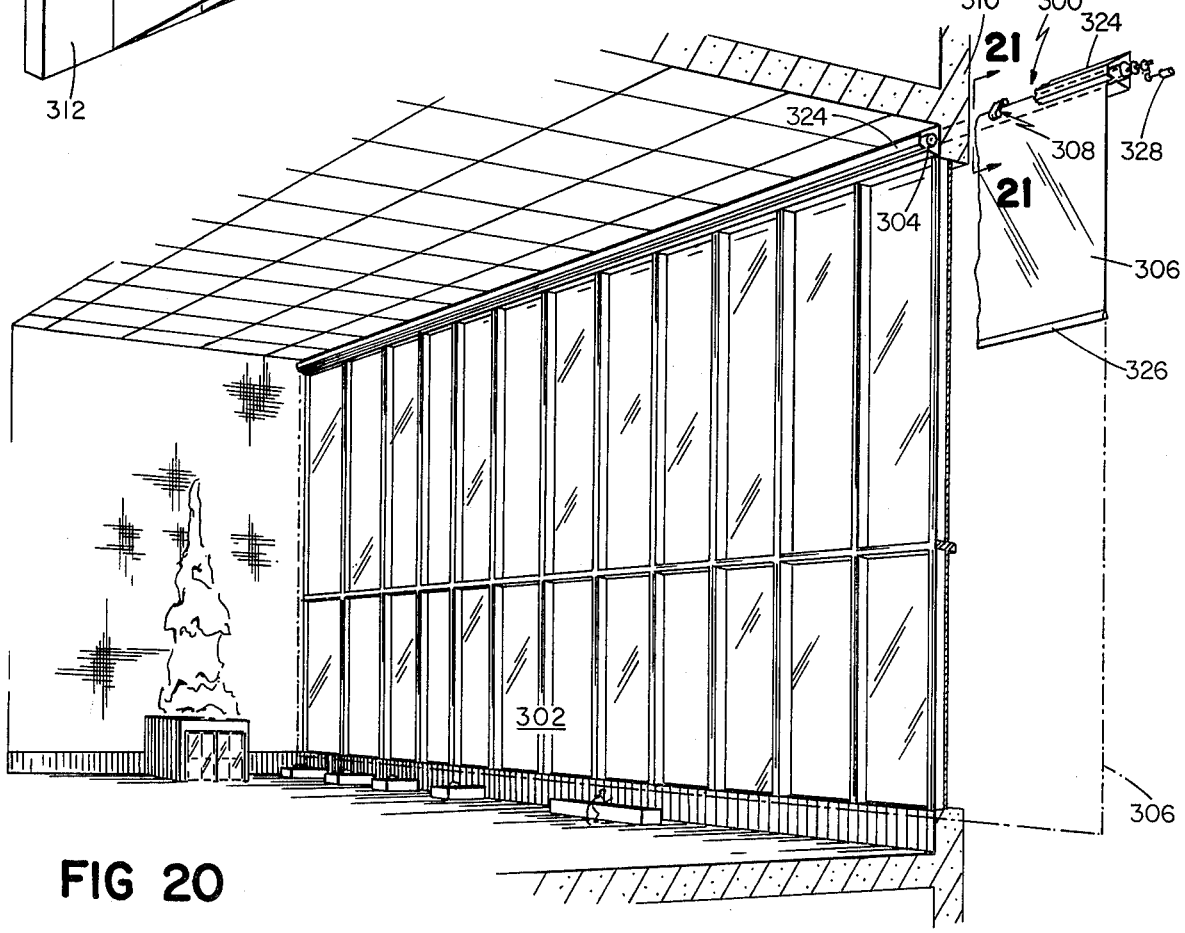
Figure 26:
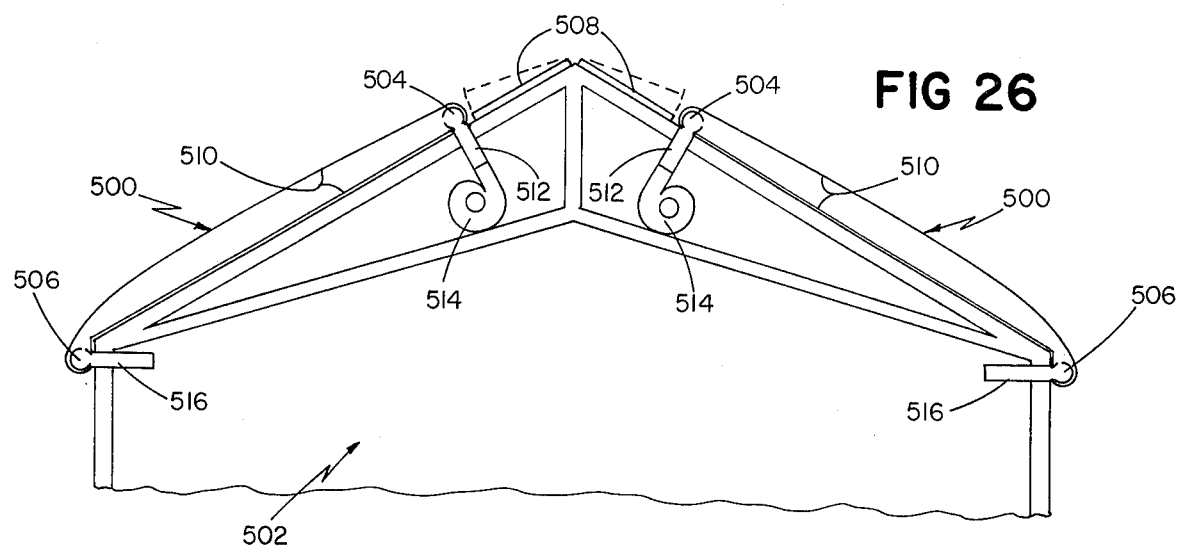
Figure 27:
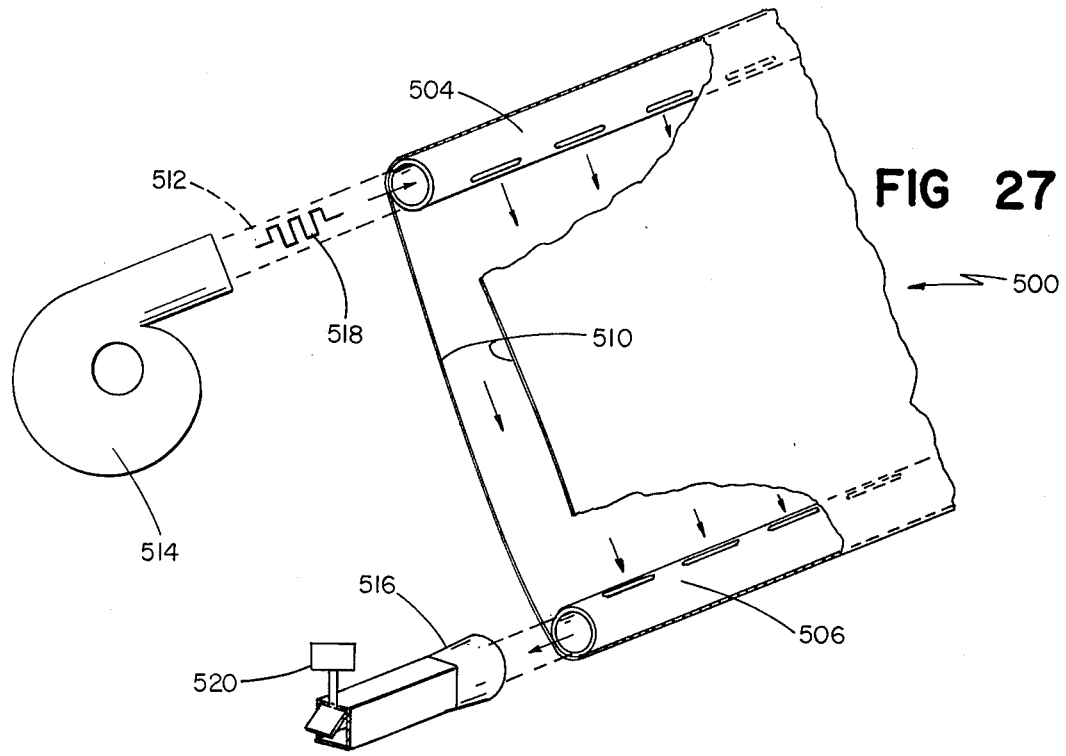
Figure 28:
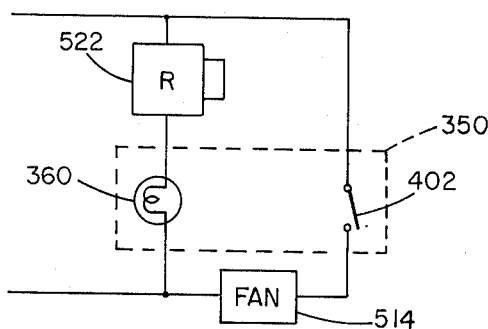
Figure 29:
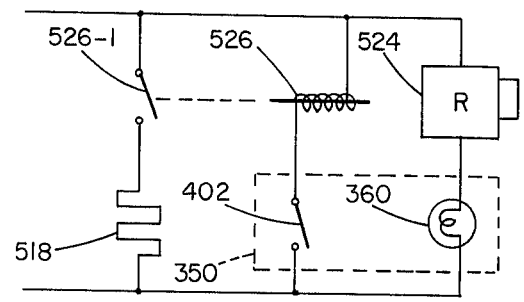
Figure 30:
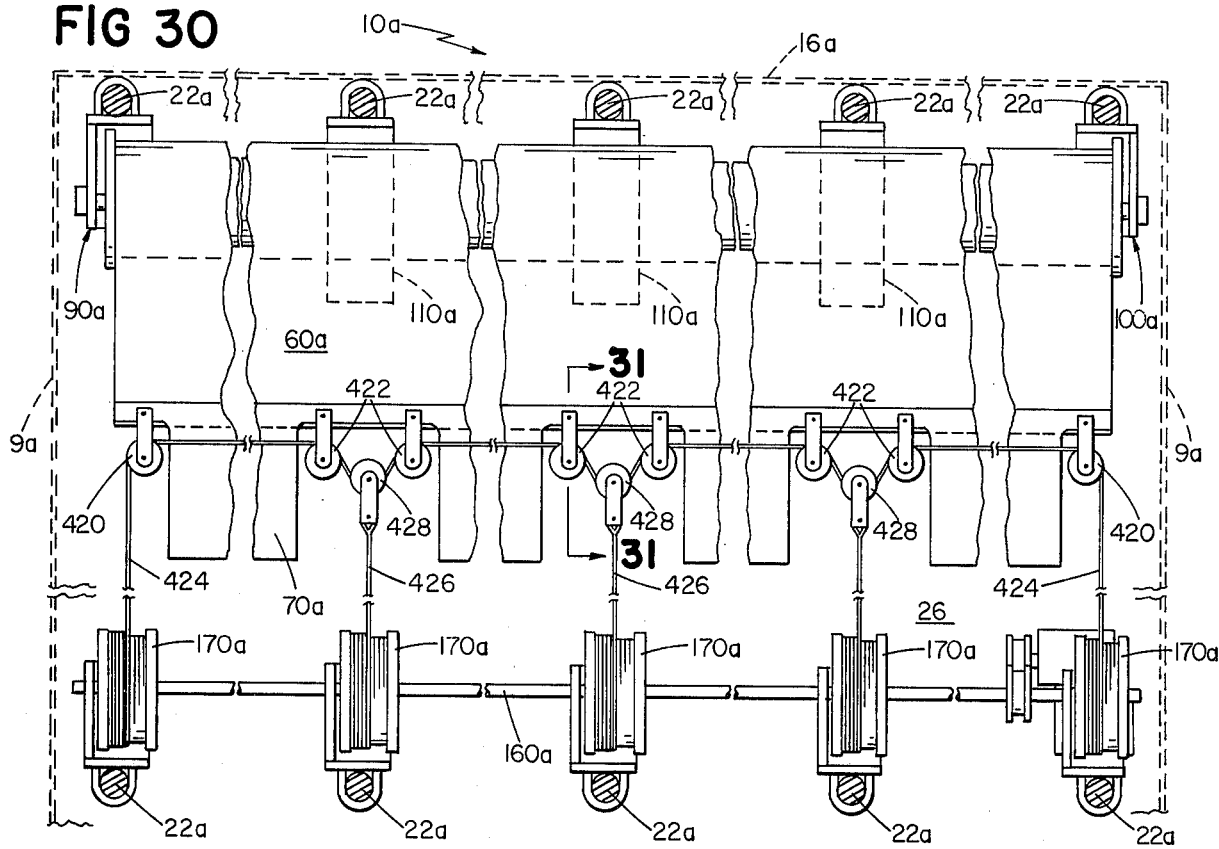
Figure 31:
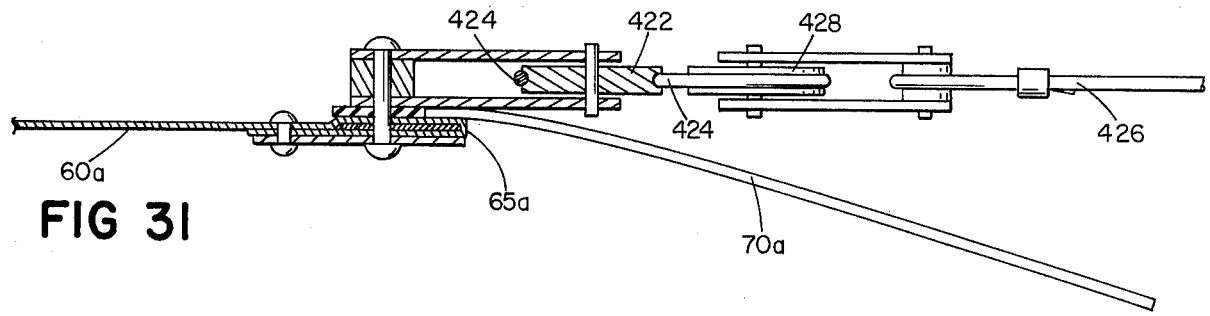

FIGS. 9 and 10 are plan sectional views taken respectively, at lines 9—9 and 10—10 of FIG. 8;

FIG. 11 is a simplified top plan view of the system of FIG. 1;

FIGS. 12-14 are sectional views illustrating the sheet carrying roller of the system of FIG. 1;

FIG. 13a illustrates a modification of a portion of the system;

FIG. 15 is a sectional view of a portion of take-up wheel of the system of FIG. 1;

FIG. 16 is a simplified sectional view of a second greenhouse including a slightly modified installation of an insulating system constructed according to the present invention;

FIG. 17 is a perspective view of portions of the system of FIG. 16;

FIG. 18 is a simplified sectional view of a third greenhouse including a somewhat modified insulating system embodying the present invention;

FIG. 19 is a perspective view, partially in section, of portions of the system of FIG. 18;

FIG. 20 is a perspective view of an insulating system constructed according to the present invention mounted adjacent a vertical glass building wall;

FIG. 21 is a sectional view of portions of the system of FIG. 20 taken at line 21—21 of FIG. 20;

FIG. 22 is a simplified perspective view of portions of the system of FIG. 20;

FIGS. 23-24 illustrate a snow detection system constructed in accord with the present invention;

FIG. 25 is a schematic illustrating connection of the snow detection system of FIGS. 23-24 to the insulating system of FIGS. 1-15;

FIGS. 26-27 illustrate a further insulating system with which the snow detection system of FIGS. 23-24 is useful;

FIGS. 28-29 are schematices illustrating control systems for the insulating system of FIGS. 26-27 incorporating the snow detection system of FIGS. 23-24;

FIG. 30 is a plan view of a modification of the greenhouse insulating system of FIGS. 1-15; and, FIG. 31 is a sectional view taken at line 30-31 of FIG. 30.

Referring more particularly to the drawings there is shown in FIG. 1 a greenhouse, generally designated 10, of conventional post support design. As shown, greenhouse 10 includes a floor 12 and side wall footings 14 of poured concrete, longitudinally extending glass side walls 16, end walls 9, 11 and a peaked glass roof 20. Walls 9, 11, 16 and rool 20 are supported by a plurality of vertical posts 22 and cross ties 24. As shown, posts 22 are arranged in two rows, each extending the length of the greenhouse with the posts in each row spaced apart from each other at approximately 10 foot intervals. The two rows of posts divide the interior of the greenhouse into three bays 26, 27, 28, each about 10-15 feet wide and extending the full length of the greenhouse. Except for cross ties 24, each bay is substantially unobstructed through its length.

A retractable insulating system constructed in accordance with the present invention and including a roll 30 around which a sheet 60 of insulating fabric 60 is wrapped mounted in each of bays 26, 27, 28. As shown, each of rolls 30 extends the full length of its respective bay and is supported in the bay, for rotation in both directions about its axis, slightly below cross ties 24 and closely adjacent one of the sides of the bay. In FIG. 1, the insulating systems of bays 27 and 28 are shown with the fabric 60 in its fully retracted position, wrapped around the roll 30. The insulating system in bay 26 is in its extended or insulating position, in which the fabric 60 extends the full width of the bay parallel to and just below the cross ties 24 of the bay.

As shown most clearly in FIGS. 3-5 and 11-13, roll 30 is of thin walled aluminum tubing and comprises a plurality of tubing sections connected end-to-end. As shown in FIG. 11, roll 30 includes six tubing sections 32 of equal length and one shorter tubing section 34. For ease of construction and installation, roll 30 may be made to any desired length by using as many equal length sections 32 as required, and then cutting one final length, length 34, as needed for the overall roll 30 to have the length desired. As shown in FIG. 12, the equal length sections 32 are connected to each other, end-to-end, by a short tubular connector 36 fitted within the axially abutted end portions of sections 32 and connected to the two sections 32 by rivets 37. Axially abutted roll sections 32, 34 (FIG. 13) are connected to each other by a spider 38 mounted within roll 30 and having a axially-extending annular flange 40 at its outer periphery connected to roll sections 32, 34 by rivets 41. Spider 38 includes an inner axially-extending flange 42 defining a bearing support extending coaxially through the center of the spider; and a bronze bearing 44 is pressed fitted within flange 42. Similar spiders are provided at the opposite ends of roll 30. As shown in FIG. 12, spider 46 is mounted within end 31 of roll section 32 and includes a cylindrical flange 45 at its outer surface connected by rivets to end 31 and a coaxial central flange 47 providing a support for a cylindrical bearing 48. At the other end 33 of roll section 34 (FIG. 13), an annular flange 49 at the outer periphery of spider 50 is connected by rivets 51 to the roll section. Spider 50 defines a coaxially central opening 52 of greater diameter than the central opening defined by bearings support flanges 42, 47 of spiders 38, 46.

As will be apparent, the overall length of roll 30 depends on the length of the bay of the greenhouse in which the roll is mounted. In some circumstances, the roll maybe several hundred feet long, in which event there will be a large number of roll sections 32. Abutting roll sections 32 will be connected by tube connectors 36; and the last of roll sections 32 will be connected to the cut-to-length roll section 34 by a spider 38.

Referring again to FIG. 11, it will be seen that fabric sheet 60 includes a plurality of fabric panels 62, 64 the adjacent side edges 63 of which are overlapped and sewn together (FIG. 9) to form the panels into a complete insulated fabric sheet of the desired length. A reinforcing fabric strip 76, extending the full width of fabric sheet 60, overlies and is stitched along the intersection between each pair of panels 62, 62 and 62, 64. Each reinforcing strip 76 extends around the leading edge 65 of fabric and is doubled back upon itself on the other side of fabric 60. As indicated one end 61 of each of the panels is connected to roll 30 so that, when the panel is unrolled, the side edges 63 extend perpendicularly of the roll. Each of panels 62 is of the same width (measured longitudinally of roll 30). The width of panel 64 is varied as required to insure that the complete insulating fabric sheet 60 has the desired overall length. A rubber flap is connected to the leading edge of fabric 60 (the edge most distant from roll 30) and extends the full length of the fabric. Notches in the leading edge flap 68 permit the flap to fit around support posts 22 when fabric 60 is in its extended insulating position.

As shown most clearly in FIGS. 8 and 10, leading edge 65 of fabric 60 is folded under to form a pocket 73 in which a flexible steel strip or batten 72 is placed. Similar pockets 74 (FIGS. 8, 9 and 11) are provided extending the width of the sheet along its side edges.

Figure 2:
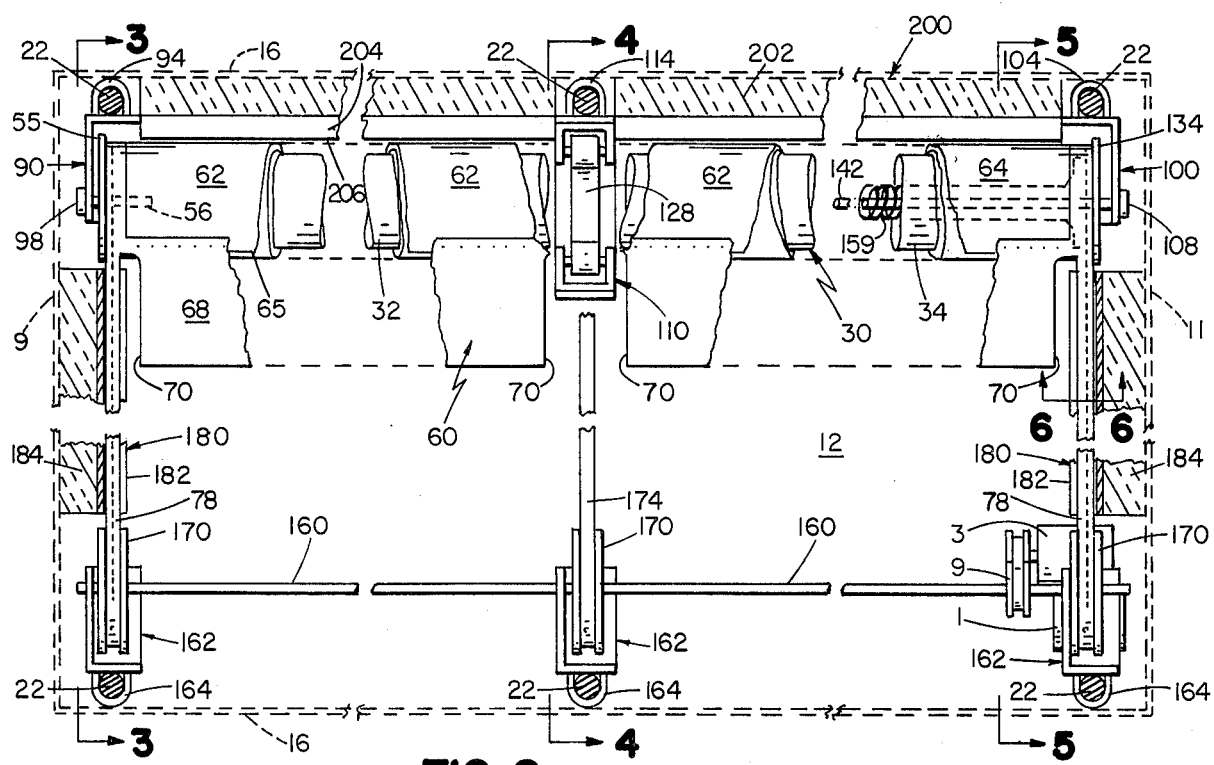
FIG. 2 is a plan sectional view of a portion of the greenhouse of FIG. 1.

Referring now to FIGS. 2 though 5, each roll 30 with a fabric sheet 60 wrapped around it is supported in position within greenhouse 10 by a plurality of support structures, generally designated 90, 100, 110, attached to posts 22. As shown, support structure 90 is attached to the post 22 adjacent end wall 9 of greenhouse 10, and supports end 31 of roll 30. Support structure 90 is attached to the post 22 nearest the other end wall of the greenhouse and supports the end 33 of roll 30 defined by roll section 34. The plurality of intermediate support structures 110 are attached to posts 22 spaced along the length of the greenhouse. Typically, a support structure 110 will be attached to each of posts 22 if the interval between the posts is greater than about 10 to 15 feet. If the supports posts 22 are at closer intervals, intermediate support structures 110 usually will be mounted on every other post 22.

Figure 3:
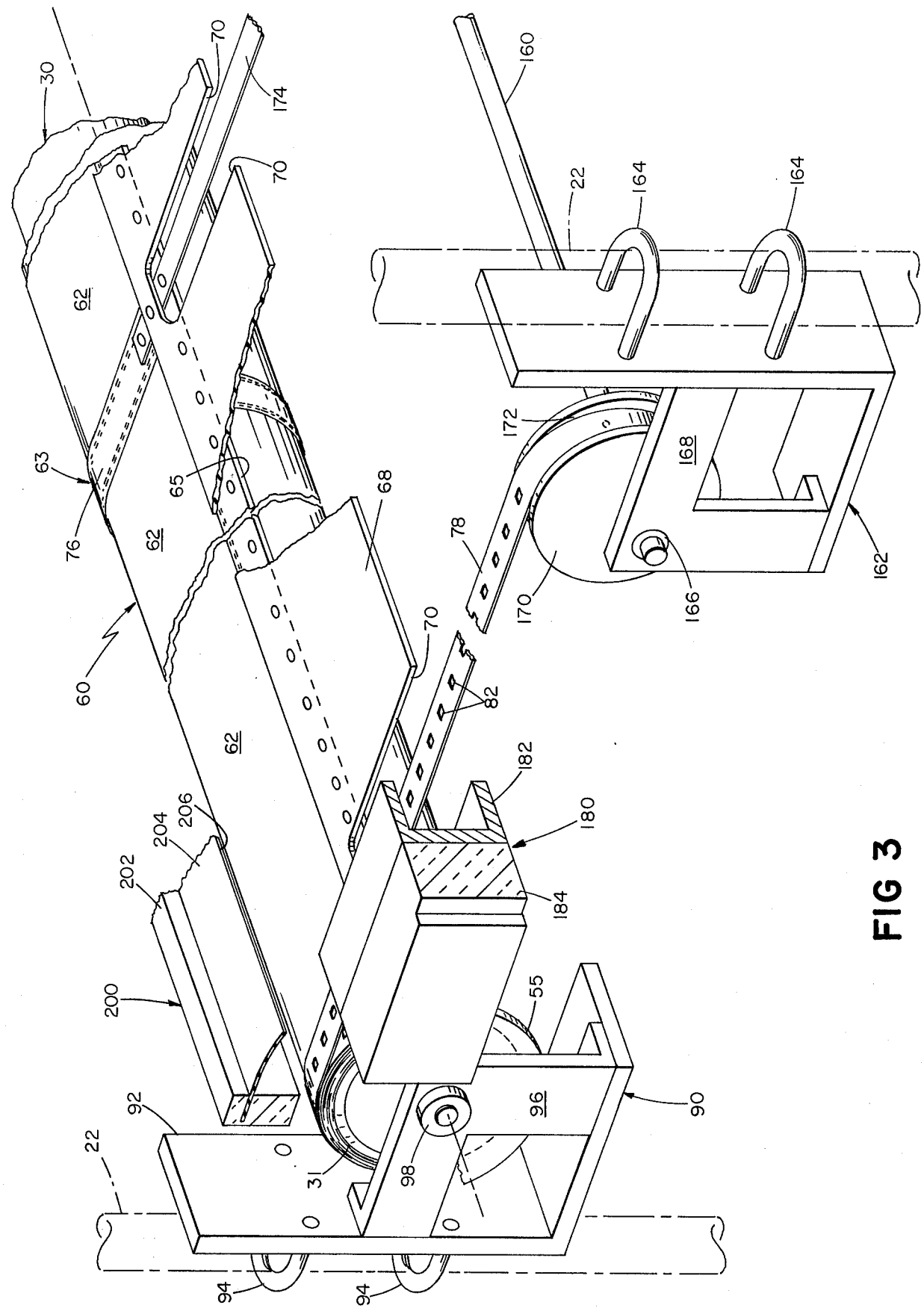
FIGS. 3-5 are perspective views, partially in section, taken respectively at lines 3—3, 4—4, and 5—5 of FIG. 2.

As shown most clearly in FIG. 3, support 90 comprises an L-shaped support bracket 92 connected by U-bolt hangers 94 to posts 22. Support structure 100 (FIG. 5) comprises a substantially identical support bracket 102 supported by U-bolts 104. To receive the shafts supporting roll 30, a roll support plate 96, 106, respectively, is mounted on the side of each of brackets 90, 100 nearest the respective end wall of the greenhouse. As shown, support plates 96, 106 are identical right-angle plates and may be mounted in either position shown. Each includes on its outer side a raised boss 98, 108 respectively through which extends a drilled opening into which a shaft supporting roll 30 is pressed fitted.

Reference is now made to FIG. 12 which illustrates in more detail the manner in which support plate 96 of support structure 90 supports roll end 31 of roll 30. As shown, roll end 31 is attached to an end cap structure including a frusto-conical portion 53 mounted coaxially with the roll with its major diameter portion (equal to the outer diameter of roll 30) abutting the outer axial end of spider 46, and a circular retaining plate 55 mounted coaxially on the outer (smaller diameter) end of frusto-conical segment 53. Bearing 48 has an overall length equal to the combined axial length of spider 46 and frusto-conical segment 53 and extends through a central coaxially opening in frusto-conical portion 53. A support shaft 56 extends from within roll 30 through bearing 48 (in bearing contact therewith) through a opening 57 (of larger diameter than the shaft) in plate 55 into and through support plate 96 into which it is pressed fitted. End cap 51 is secured to roll 30 by a plurality of recessed bolts 59 extending from the end plate through the frusto-conical segment into spider 46.

A similar end cap structure 130 is attached to roll end 33. As shown most clearly in FIG. 13, end cap structure 130 includes a first segment 132 attached to spider 50 and having a frusto-conical outer surface of major diameter equal to that of roll 30, and an end plate 134 of greater diameter than roll 30 attached to the outer smaller diameter end of segment 132. Bolts 137, 138 secure, respectively, segment 132 to spider 50 and end plate 134 to segment 132. Segment 132 includes a generally cylindrical flange 133 projecting coaxially through opening 52 in spider 50 into the interior of roll 30. A bearing 140 is press fitted into a coaxial bore extending through segment 132. Shaft 142 is journalled within bearings 44 in spider 40 and 140 in end cap segment 132 and extends from within roll 30 through coaxial opening 136 in end plate 135 and into bore 146 of support plate 106 of support structure 100, in which it is press fitted.

A generally circular plate 147 having a projecting coaxial flange 148 is mounted coaxially on shaft 142 closely adjacent spider 38 on the side thereof facing end 133. Plate 147 is fixed on shaft 142 by a pin 149 extending diametrically through flange 148 and shaft 142. A winder support 150 is attached by bolts 152 to plate 147 in position coaxially surrounding shaft 142 and on the side of plate 147 towards end 133. As shown, winder support 150 concludes a coaxial bore 151 of diameter greater than shaft 142 extending axially therethrough, a base plate portion 153 axially abutting plate 147 and a upstanding cylindrical flange 154 projecting from base 152 towards flange 133 of end cap 130. As shown, the adjacent portions of flanges 150 and 133 define facing frusto-conical surfaces 156, 158 respectively. Helical spring 159 extends between flanges 150 and 133, with the ends of the spring expanded and wrapped around the flanges so that turns of the spring fit within helical grooves in surfaces 156, 158.

Referring again to FIG. 4, each of intermediate supports 110 comprises a generally U-shaped support bracket 112 attached by U-bolts 114 to one of posts 22. Four guides 116 are mounted, as shown, within U-shaped bracket 112. Two guides 116 are mounted on the vertical leg 118 to which U-bolts 114 are attached. The other two guides 116 are mounted on the other vertical leg 120. As shown, leg 120 has a height equal to only approximately two-thirds that of leg 118.

Figure 4:
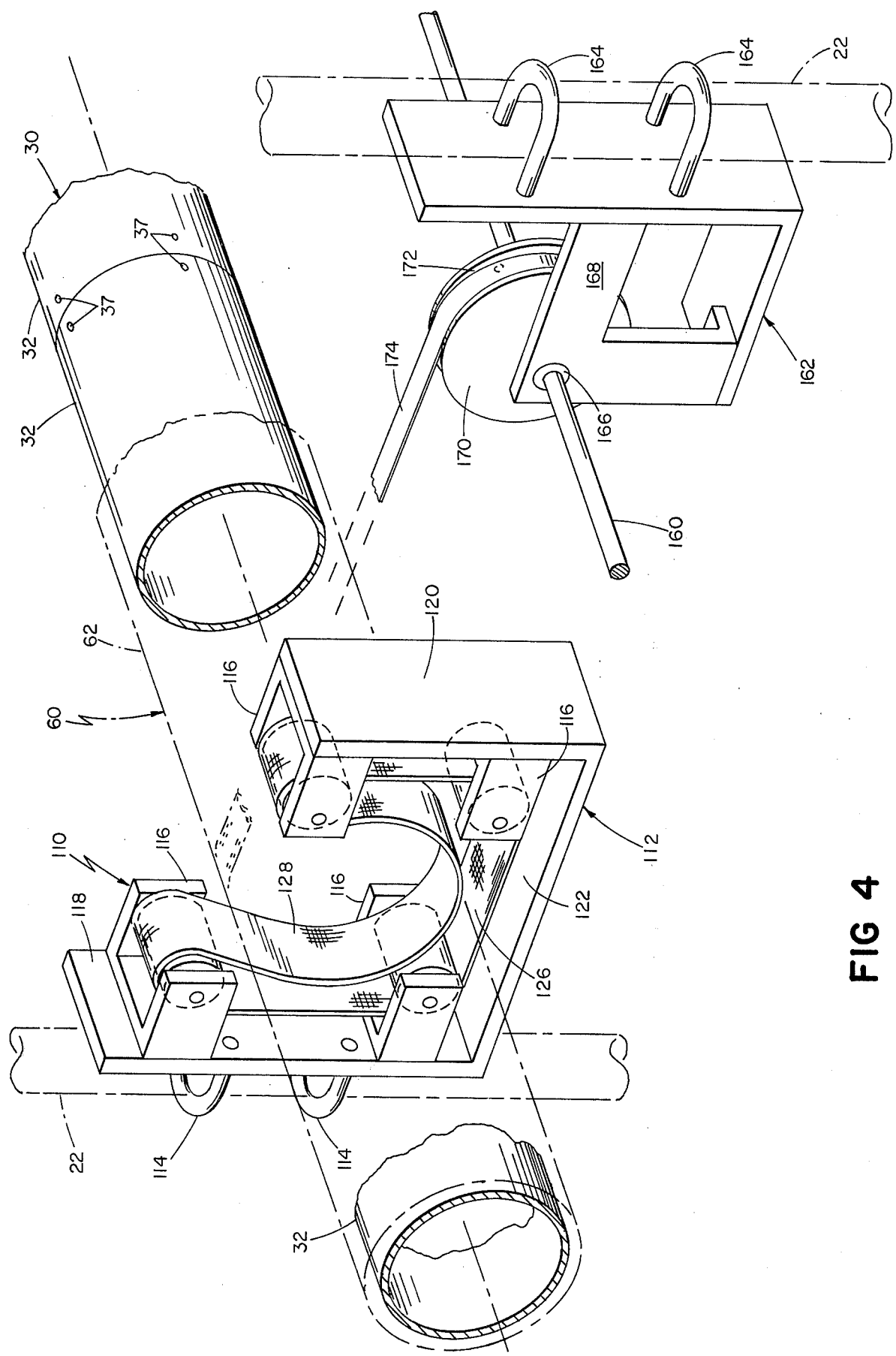

As shown, each guide 116 includes a cylindrical roller mounted in a U-shaped support with its axis parallel to that of roll 30. The two lower rollers are mounted with their axes in substantially the same horizontal plane and are spaced above the lower base 122 of support bracket 112. The upper guide 116 on leg 120 is mounted adjacent the top of the leg 120 with the periphery of its roller extending above the horizontal plane in which the top of leg 120 and the top of the bracket supporting the roller lie. The vertical distance between the axes of the two rollers on leg 120 is slightly less than the diameter of roll 30. The upper guide on leg 118 is mounted above the top of roller 120, so the distance between the axes of the two guide rollers on leg 118 is substantially greater than the diameter of roll 30. A continuous belt 126 is entrained around all four rollers, as shown in FIG. 4. The overall length of belt 126 is such that the inner partial loop 128, which engages the outer surface of roll 30 and the fabric 60 wrapped thereupon, is a spaced above the lower pair of guide rollers 116.

As will be evident, the overall diameter of roll 30 and wrapped fabric 60 will be greater when the fabric is wrapped around the roll than when most of the farbic is unwrapped and in its insulating position. In the illustrated embodiment, in which the diameter of the tubes forming roll 30 is relatively large, fabric 60 is quite thin, and the width of each bay is not too great, this variation in diameter is relatively small. In other embodiments, the variation may be far greater and it will be necessary to permit vertical movement of roll ends 31, 33. Such movement may be provided by removing shaft 56 and replacing support 90 with a belt support system similar to that of intermediate supports 110, and by replacing shaft 142 at end 33 with a flexible shaft or coupling such as that designated 2 in FIG. 13a. As illustrated, flexible shaft 2 comprises a length of steel cable 4 extending between and coaxially secured to a pair of short cylindrical rods 6, 7. In use, one of rods 6, 7 is press-fitted within the bore 146 in support plate 106; the other is connected coaxially within plate 147 by pin 149.

Figure 5:
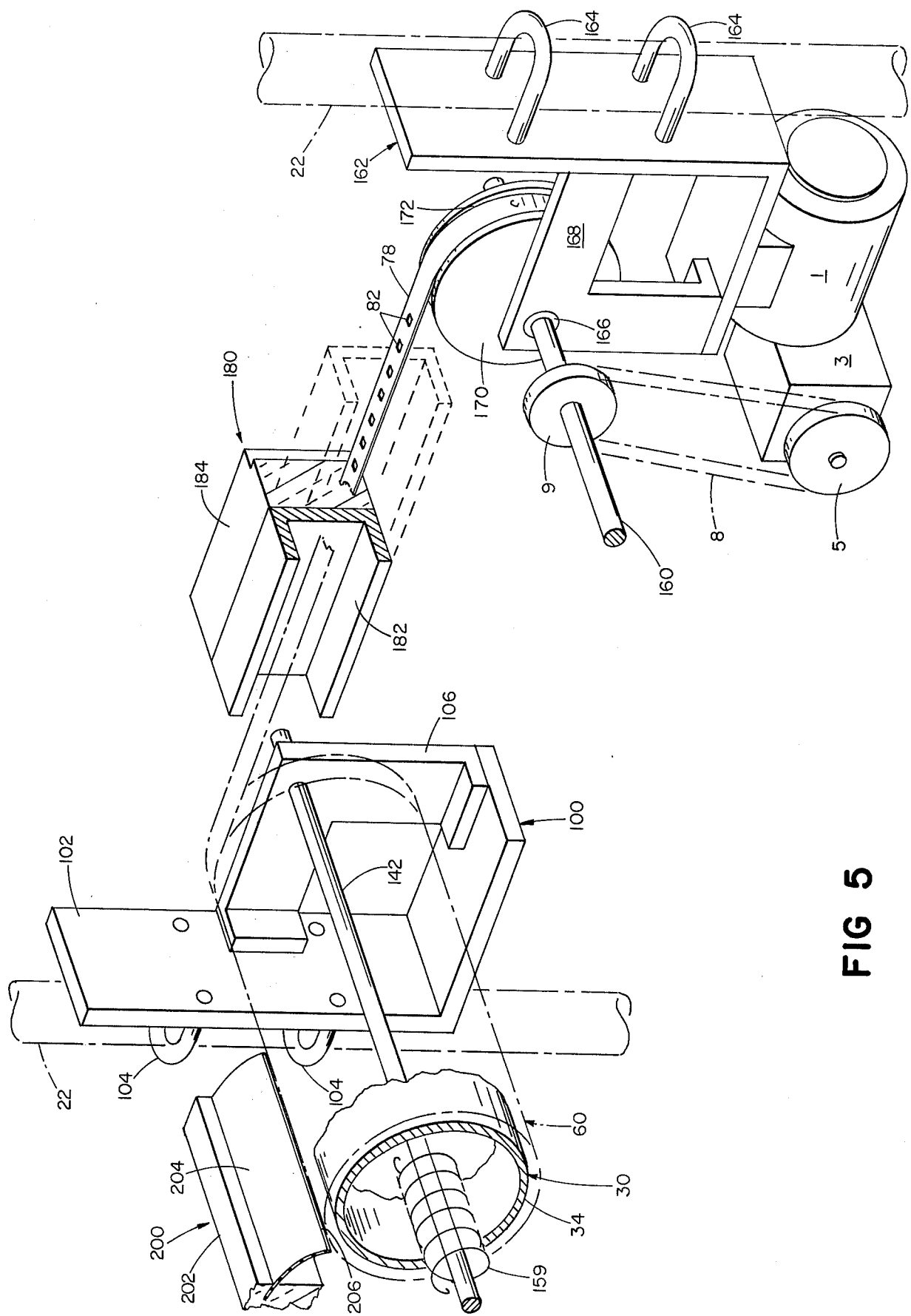

The structure for unwinding fabric 60 from around roll 30 and extending it into its insulating position is shown most clearly in FIGS. 1 through 5. As there illustrated, a takeup shaft 160 extends the full length of each bay of greenhouse 10 on the side of the bay spaced away from respective one of rolls 30. Each takeup shaft 160 is supported by a plurality of support brackets 162 mounted on vertical posts 22 spaced along the full length of the respective bay. As shown in FIGS. 3 through 5, each of supports 162 is substantially identical to support structure 100 and is attached to the respective one of posts 22 by U-bolts 164. Shaft 160 extends through and is journaled within bearings 166 mounted in the support plates 168 of support brackets 162. A takeup wheel 170 having a U-shaped peripheral groove 172 therein is keyed to shaft 160 adjacent each of supports 162. A flexible steel strap 174 extends from each of wheels 170 (other than the outermost wheels at the opposite ends of greenhouse 10) to the leading edge 65 of fabric 60 and is there attached to the upper surface of fabric 60 by rivets 176. To provide a secure fastening, strip 174 extends a substantial distance (about 6 to 8 inches) beyond the leading edge 65 of fabric 60, a backing plate 178 is provided on the underside of the fabric in juxtaposition with the overlying portion of strip 174, and rivets 176 extend through the backing plate.

A motor 1 and gear reduction unit 3 are mounted on the bottom of support 162. A drive belt 8 connects the output wheel 5 of gear reduction unit 3 to a drive wheel 9 keyed to shaft 150. Motor 1 is reversible and includes an internal brake which automatically brakes the motor shaft whenever the motor is turned off.

As will be apparent, the point on which straps 174 are attached to fabric 60 will depend on the location of support posts 22. The connection illustrated in FIGS. 8 and 10 is intermediate the edges of a panel 62 of fabric 60. As will be seen in FIG. 11, other straps 174 are connected to fabric 60 at the intersection of two of panels 62, and in these instances the steel strap 174 overlies reinforcing cloth strip 176 at the panel junction. To provide the desired strength regardless of the point of connection, the length of the portion of strap 174 overlying the fabric is always made greater than the width of the pocket carrying batten 72. Thus, at least one of rivets 176 will pass through the batten and another of the rivets 176 will pass through the fabric on the side of the batten most distant from the fabric leading edge 65. The other ends of strips 174 are attached to wheels 170. The leading end of the strap 174 lies within the groove 172 of wheel 170 and is secured to the wheel by radial screws as described hereinafter.

Reference is now made to FIGS. 2, 3 and 5-8 which illustrate the structure, generally designated 180, supporting the transverse side edges 66 of fabric 60 when the fabric is in its extended insulated position. As shown most clearly in FIGS. 3, 5, and 6, the support structure 180 at each end of a greenhouse bay comprises a channel 182 mounted on the end of the bay with the open side of the channel extending horizontally across the width of the bay and facing inwardly toward the open bay. A block of insulating material 184, typically rubber or foamed plastic, extends from the back of the channel to the adjacent end wall 9, 11 of the greenhouse, thereby sealing the area between the channel and the greenhouse wall and preventing airflow therethrough. A pair of rubber flaps 186 are secured to the upper and lower inside edges of the channel and extend the full transverse width of the particular greenhouse bay. As shown in FIG. 6, the free edges 187 of rubber flaps 186 are in sliding contact with the upper and lower horizontal surfaces of fabric 60, providing a seal therewith.

A number of sprocket-pulley sets, generally designated 188 are mounted at intervals within and along the full transverse length of channel 182 and provide positive engagement between the side structures 180 and the transverse side edges 66 of fabric 60. As shown in FIGS. 6 and 7, each sprocket-pulley set 188 comprises a pulley 190 mounted for rotation on a bearing 191 and shaft 192, and a sprocket 194 mounted on shaft 193 and bearing 196 below pulley 190 with sprocket teeth 195 fitted within the annular groove 189 of pulley 190. As shown in FIG. 6, a cylindrical spacer 198 is mounted on bearing 196 on each axial side of sprocket 194. Each spacer 198 is of lesser overall diameter than sprocket 194 and is in substantial vertical alignment with one of the annular rims of pulley 190. As shown, the outer cylindrical surfaces of the pulley rims and of the adjacent spacer are spaced slightly from each other to permit the fabric 60 to pass therebetween.

Referring now to FIGS. 8 and 9, the transverse side edges 66 of fabric 60 are folded over and stitched to provide a transversely extending pocket 74 in which is mounted a flexible steel strap 78. Strap 78 and the overlying portions of fabric 60 forming pocket 66 are perforated along their respective lengths. The perforations (perforations 80 in fabric 60 and 82 in strap 78) are of the proper cross section (square as shown) and spacing so that they will mesh with the teeth 195 of sprocket 194 as the side edge 66 of the fabric is drawn between pulley 90 and sprocket 94. To fix strap 78 relative to fabric 60, a number of notches 84 are spaced along the inner edge of the strap 78 with pocket 66, and the surfaces of fabric 60 forming the inside of pocket 74 are coated with an adhesive. Additionally, the openings 80 and 82 are punched in the fabric and strap after the pocket has been formed and the strap adhesively secured therein.

As shown in FIGS. 2, 3, and 5, straps 78 extend from the edge of fabric 60 attached to roll 30, through the full width of the fabric, and across the width of each greenhouse bay to the grooved pulleys 170 mounted adjacent the opposite axial ends of rod 160. The straps are secured within the grooves of pulleys 170 by radially extending set screws.

Referring now to FIGS. 2 and 5, an insulating structure generally designated 200 is provided between roll 30 and the adjacent side wall 16 of the greenhouse. As shown most clearly in FIG. 5, the insulating structure includes a block of foamed plastic material 202 extending horizontally at the same level as roll 60 between adjacent pairs of support posts 22 and a sheet of flexible rubber 204 having one longitudinal edge portion thereof secured to block 202 in the other edge thereof 206 wiping the exterior of roll 30 with the fabric 60 rolled thereupon.

Similar insulating structure is provided between bays 26 and 27, and between bays 27 and 28 of the greenhouse 10 of FIG. 1. The insulating structure between bays 26 and 27 comprises insulating blocks 202 extending between adjacent pairs of posts 22, with one longitudinally extending side edge of the block closely adjacent the shaft 160 in bay 26 and the edge 206 of the rubber sheet wiping the roller 30 in bay 27. The structure between bays 27 and 28 is similar.

Reference is now made to FIGS. 13 and 14 illustrating the manner in which the trailing longitudinal edge 88 of fabric 60 (comprising panel ends 61) is secured to roll 30. As shown, a outwardly convex backing strip 208 is positioned over the longitudinally extending trailing edge portion 88 of fabric 60. Strip 208 extends the full length of roll 30 (either as a single piece or as sections placed end-to-end), with its longitudinally extending edges engaging the outer surface of fabric 60. Rivets 210 spaced at regular intervals along the strip pass through the strip into and through the periphery of roll 30, pulling the strip tightly against the roll and holding fabric 60 tightly in place between the roll and backing strip.

FIG. 15 illustrates in somewhat more detail the manner in which straps 78 and 174 are attached to pulleys 170. As shown, a portion of the base 212 of the groove 172 of pulley 170 is removed to provide a pair of flats 214, 216 spaced radially inwardly from base 212. The distance the flats are recessed is such that the heads of set screws 179 will not project beyond the diameter of base 212. A rectangular in cross section slot 218 extends diagonally into the body of the wheel from flat 214 generally parallel to flap 216. The leading end of strip 78 (or of a strip 174) passes over major portion of flat 214 and is inserted into slot 218. Set screws 179 pass from slots 216 and 214 through the strap and hold it in place. The strap is then wrapped around pulley 170 several times thereby preventing excessive stress at its points of connection to the pulley.

FIGS. 16 and 17 illustrate the manner in which the insulation system of the present invention is supported in a greenhouse, generally designated 10' of overhead trust construction. The system of FIG. 16 is essentially the same as that previously discussed and similar portions thereof are identified by the same references numerals with a differentiating prime (') added thereto. As shown, roll 30' is mounted at one longitudinal wall 16 of the greenhouse and takeup structure 160' on the opposite wall. To support the fabric 60' when it is extended between the two walls, a plurality of post supports, generally designated 220, are spaced at intervals along the center line of the greenhouse. As shown most clearly in FIG. 17, each post support 220 includes an upright pole 222 with a tee 224 at the top thereof and rollers 226 projecting outwardly from opposite sides of tee 224 generally parallel to the peak of the greenhouse. Each roller 226 is mounted for rotation about its axis, and engages the underside of fabric 60'.

Further to prevent the fabric 60 from sagging, it is often desirable to provide an overhead guide system, such as that generally designated 228 in FIG. 17. Similar guide systems to that shown may be used in insulating systems such as that of FIGS. 1-15, and typically will be used when the bay becomes relatively great. As shown in FIG. 17, guide system 228 includes a support channel 230 extending transversely the width of a greenhouse (or, in the system of FIGS. 1-15, the width of a greenhouse bay) above fabric 60' and aligned with a strap 174 and pulley 170. A T-shaped support, including a vertical post 232 secured at its lower end to the leading edge 66' of fabric 60' adjacent the fabric and rubber flap 70', and a pair of horizontal rollers 234 secured to the upper end of the post, extends upwardly from the fabric into channel 230. As shown, a pair of inturned lips 238 at the bottom of channel 230 form a slot into which support 232 extends and a pair of upwardly facing surfaces on which rollers 234 roll.

FIGS. 18 and 19 illustrate a further modification of the insulation system of the present invention mounted in a greenhouse 10" of modified truss construction. As before, portions of the system of FIGS. 18 and 19 are identified by the same numbers as corresponding portions of the system previously discussed, with a differentiating double prime (") added thereto. As shown in FIG. 18, greenhouse 10" includes support posts 22' extending down the center and spaced along the side walls 16" of the greenhouse, a roll 30" carrying insulating fabric 60" mounted on each side of the center row of posts 22', and a take-up system mounted along each side wall.

The take-up system, shown most clearly in FIG. 19, includes a take-up shaft 160" and pulleys 170' mounted on support brackets 162" attached to the posts 22" adjacent each of the greenhouse longitudinal side walls 16". An overhead support system 228" similar to that already described with reference to FIGS. 16 and 17 is provided to prevent sag of the extended fabric.

Insulating fabric 60' includes a pair of superposed fabric sheets 242, 244. The leading edges of sheets, 242, 244, adjacent flap 70", are spaced apart by a spacer block 246 extending the full length of the leading edge. A male coupling 248 is secured to the lower fabric sheet 224 adjacent the leading thereof and extends downwardly from sheet 244. As shown, coupling 248 is generally circular in cross section and includes a central bore 250 permitting flow of air into and from the space between the superposed fabric sheets, and an annular groove 252 in its outer periphery. A fan 254 having an outlet nozzle 256 is mounted on support 162" below shaft 160". A female coupling 258 is mounted on nozzle 256 above shaft 160" in position for engaging male coupling 248 when the fabric 60" is drawn into its insulating position. Female coupling 258 includes an upwardly facing channel 260 having a pair of opposed flanges 262 arranged to slide into annular groove 252 of male coupling 248. The base 264 of channel 260 is curved downwardly toward the center of the greenhouse to provide a camming action as it engages the bottom of the surface of male coupling 252. When male coupling 248 is drawn fully into female coupling 258, bore 250 in coupling 248 is coaxially aligned with a bore 266 extending through female coupling 258 into communication with fan nozzle 256. Typically, fan 254 is rated at about 2 inches water pressure at a delivery rate of 250 cfm.

Reference is now made to FIGS. 20-22 illustrating an insulating system of the present invention, generally designated 300 used to reduce nighttime heat loss through large vertical glass wall 302 of, for example, a modern bank building. As shown, insulating system 300 includes a roll 304, around which is wrapped a sheet of insulating fabric 306, mounted for rotation above window 302 with its axis substantially horizontal and parallel to the upper edge of the winder. The construction of roll 304 and the manner in which it is attached to fabric 306 is substantially identical to that previously discussed with reference to the embodiment of FIGS. 1–15. To support the roll of fabric in position, a plurality of supports 308, shown most clearly in FIGS. 21–22, are spaced along the length of the roll and attached to reinforced concrete lip 310 at the top of window. Each support 308 includes a backplate 312 attached to concrete 310, a pair of side plates 314 extending perpendicularly outwardly from plate 312 and spaced slightly apart from each other, and five rollers 316 mounted between side plates 314 with their axes parallel to that of roll 304.

Side plates 314 are identical. Each includes a large generally circular opening 318 in the center thereof to receive the roll 304 of fabric and an opening 320 extending vertically downwardly from circular opening 318, generally, tangent to the side of opening opposite backplate 312, to the bottom of the sideplate. A belt 322 is entrained around rollers 316 to provide a surface of relatively large area engaging the fabric 306 wrapped around roll 304.

The arrangement of rolls 316 relative to roll 304 is shown most clearly in FIG. 21. As shown, the pair roll 316 adjacent backplate 312, one near the top of the plate, the other near the bottom and slightly below opening 318, act as belt return rollers. The other three rollers support the portions of belt 322 engaging the roll 304; one mounted adjacent and on each side of opening 320 and the third on the diametrically opposite side of opening 318. When the roll 304 with fabric 306 wrapped therearound is mounted on belts 322 in supports 308, the leading edge of the fabric extends downwardly through opening 320.

For asthetic purposes, the support structures 308 and roll 304 of system 300 are covered by a longitudinally-extending generally trapezoidal in cross-section cap 324 of sheet metal. Cap 324, as shown in cross section in FIG. 21, includes a longitudinal opening extending its full length in the bottom thereof and mating with the openings 320 of supports 308.

The bottom, e.g., leading, edge of fabric 306 is stitched back upon itself to form a pocket 326 in which is mounted a lead or other metal bar of sufficient weight to keep the fabric fully extended. To move the fabric between its extended (insulating) and retracted (storage) positions, a drive system generally designated 328 is provided adjacent one end of roll 304. As shown, the drive system comprises a reversible braked motor connected by a drive chain to a drive shaft at the end of the roll. When the motor rotates roll 304 in one direction the fabric is unwound from the roll and, pulled by weight 326, moves downwardly over the inner surface of window 302. To retract the fabric into its storage position, the motor is simply reversed.

Further modifications may be made in the above-described invention. For example, a direct drive motor may be mounted on one end of the take-up shaft, when space permits, in lieu of the drive belt system shown in FIG. 5. Similarly, the roll of insulating fabric may be biased towards its storage position by a counterweight attached to the roll, in lieu of the internal helical spring system shown in FIG. 13. If the insulating sheet and the design of installation are such that edge sag is not a serious problem the sets 88 of FIGS. 6 and 7 may be omitted. Fewer rollers may be used to support the roll of insulating material and, if the material is of sufficient strength, the rollers themselves may engage it thereby permitting elimination of the entrained supporting belt.

Additional modifications may be made in the insulating sheet and in the structure used to deploy it. One principal such modification, shown in FIGS. 30–31, insures that the tension exerted on the insulating sheet is constant across the full length and width of the sheet. The system there shown is a modification of that previously discussed with reference to FIGS. 1–15, and corresponding portions are identified by the same reference numerals, with a differentiating suffix "a" added thereto. Thus, for example, the greenhouse in FIGS. 30–31 is generally designated 10a, whereas that of FIGS. 1–15 was designated 10.

Referring more particularly to FIGS. 30–31, roll 30a around which insulating sheet 60a is wrapped is mounted for rotation on greenhouse support posts 22a along greenhouse side wall 16a by support structures 90a 100a and 110a. Take-up shaft 160a is mounted on supports 162a on the posts 22a along the opposite side of bay 26a. Take-up wheels 170a are keyed to shaft 160a.

A pulley 420 is mounted, with its axis of rotation perpendicular to the plane of sheet 60a, adjacent each corner of the leading edge of the sheet and in alignment with the end ones of take-up wheels 170a. Pairs of pulleys 422 are mounted along the sheet leading edge with the center of each pair aligned with an intermediate one of take-up wheels 170a. A cable 424, attached at its ends to the end ones of take-up wheels 170a, extends from take-up shaft 160a to sheet leading edge 65a along the leading edge through all of pulleys 420, 422. Cables 426 attached to the intermediate ones of take-up wheels 170a extend from the take-up wheels to each of pulleys 422, and a pulley 428 is attached to the end of each of cables 426. Cable 424 is threaded through pulleys 428, with each of pulleys 428 intermediate a pair of pulleys 422. When shaft 160a is rotated to draw sheet 60a across a bay, it will be seen that the tension on each of pulleys 422 attached to the sheet leading edge will be substantially the same, regardless of minor variations in cable, wheel and pulley size or alignment.

When, as in this modification, cables are used in lieu of the flat steel straps previously discussed with reference to FIGS. 1–15, it may be convenient for the take-up wheels to have helical grooves cut therearound to insure proper wrapping of the cables. It may also be desirable, whether using cables or flat steel strips, to provide a hollow pipe at the leading edge of the insulating sheet to decrease sagging.

The insulating sheet itself may comprise any of a wide range of materials. The choice will depend on, among other things, cost and the insulating factor required. When, as in the illustrated embodiments, the inner surface of the sheet is coated or faced with a reflective material, the insulating factor of the sheet is far greater than if the surface is unfaced. For example, the insulating resistance of a single layer of full reflective faced material is almost as great as that of two layers of unfaced material with an insulating space therebetween.

When using multiple layers it may be desirable to place foam strips or spacers between the layers to space them apart when the insulating sheet is extended, in lieu of the inflating system shown in FIGS. 18 and 19. It often will also be desirable for the insulating sheet to comprise a single sheet of organic plastic sheet material, in lieu of multiple fabric panels sewn together. When plastic material is used, either as a single sheet or as a plurality of attached panels, it will generally be necessary to provide cables or the like extending from sheet leading edge to the roll around which the insulating sheet is stored. The tensile strength of most plastic sheet materials is low and it is not desirable to exert the force from the take-up shaft directly on the sheet material itself.

With respect to sealing the edges of the extended sheet, it may be desirable to mount an insulating flap along the full length of the periphery of the roll, so arranged that as the last insulating sheet is unwound the flap will project from the roll and engage the adjacent side wall of the greenhouse, in lieu of mounting a flap such as that shown in FIGS. 2 and 5 on the greenhouse wall. Similarly, in lieu of the side and front edge seals previously discussed, it may be desirable to mount an inflatable edge seal on the insulating sheet along its front and side edges, and to provide a system such as that shown in FIG. 19 to inflate the seal when the sheet is drawn into its insulating position.

Regardless of the system employed, the general operation is substantially the same. During the day the insulating fabric is wrapped around the roll to permit light to pass through the glass into the greenhouse or other structure. At night, or under weather conditions in which due to extreme cloudyness or cold, it is desirable to prevent heat loss from the building, the fabric is moved from its withdrawn position into its insulating position by actuating its motor drive system. In the greenhouse embodiments shown, the motor rotates the takeup shaft, such as shaft 160, drawing the fabric outwardly from the roll and into a plane extending across the width of the greenhouse or greenhouse bay. When the fabric is fully extended, with the rubber flap at its leading edge engaging, as appropriate, either the next roll or the far glass wall of the greenhouse in sealing relationship, it engages a limit switch, the motor is turned off and the automatic brake associated with the motor holds the fabric in its extended position. To withdraw the fabric the next day, the motor is reversed and retracts the fabric until another limit switch is tripped. In the embodiments shown in FIGS. 1-15, the helical spring 159 within roll 30 is drawn into tension when the fabric is extended and tends to rotate the roll in the other direction to wrap the fabric back around the roll. The motor permits the fabric to be withdrawn at a controlled rate. In the vertical glass embodiment, no withdrawing cables or internal spring is necessary, and the fabric may be withdrawn and retracted simply by rotating the roll in opposite directions.

As previously indicated, one potentially serious problem with insulating greenhouses is that snow or ice may build-up on the roof (or any other non-vertical surface). In conventional, e.g., non-insulated, greenhouses, heat from the greenhouse interior maintains the roof temperature well above freezing, and any snow or ice is quickly melted. When the roof is insulated, however, the roof temperature may drop well below freezing (i.e., below 0° C.), snow or ice may build-up, and the greenhouse roof may collapse or otherwise be seriously damaged.

Snow and ice build-up can be prevented by removing any insulating between the heated greenhouse interior and the greenhouse roof, thereby permitting the roof temperature to rise to above freezing, when the weight of the frozen precipitation exceeds a predetermined level. The level depends, of course, on the design strength and condition of the particular greenhouse.

FIGS. 23-25 illustrate a detection system, generally designated 350, for detecting snow or ice build-up and, a control system for causing the insulating system of the embodiment of FIGS. 1-15 to move into its retracted position when the build-up exceeds a predetermined load (in the illustrated embodiment about 1 pound per square foot). As will become apparent, detection system 350 may be used with any system in which excessive snow or ice build-up must be prevented.

Referring now to FIGS. 23-24, detection system 350 includes an annular wall 352 and closed at its bottom by a disc 354. A nylon base 356 supporting a balance beam 358 and an electric light 360 are mounted within the cylindrical cavity of wall 352. As shown, the base of light 360 is attached directly to wall 352. Base 356 is attached to wall 352, with the bottom of the base engaging or closely adjacent disc 354, by a shaft 374 extending diametrically of wall 352 and through the base.

The top of the cylindrical cavity is closed by a thin flexible circular disc 362 secured at its periphery to the upper edge of wall 352. A pair of cross-beams 364 support the central portion of disc 362. The annular portion 366 of disc 362 radially intermediate the outer ends of beams 364 and wall 352 includes a series of corrugated rings, permitting relatively free axial movement (through a short distance) of the central portion of the disc relative to its fixed periphery. In the illustrated embodiment, disc 362 is of stainless steel. In other embodiments it may comprise a wide range of materials including, for example, a rolling seal diagraphm such as those sold by Bellofram Corp. of Burlington, Mass.

Beams 364 are secured at their centers in cross-grooves in the top of a cylindrical support 365. A shaft 368 extends, coaxially with disc 362 and wall 352, vertically downwardly from a coaxial bore in the bottom of support 366, (into which the shaft is threaded and relative to which it is fixed by a set screw 372), to an end of balance beam 358, to which the shaft is pivotally connected by a pin 370.

Balance beam 358 is pivotally mounted on support 356 by shaft 374. A threaded bore 376 extends longitudinally into the beam, from the end on the side of shaft 374 opposite pin 370. The threaded shaft of a counterweight 378 is threaded into bore 376 and is fixed relative thereto by a set screw 380.

A copper plate 382 having an electrical contact 384 mounted on each end thereof is mounted on the underside of beam 358 at the end thereof adjacent counterweight 378 with one of contacts 384 on each side of the beam and the plate pivotally movable in a plane perpendicular to the axis of bore 376. A pair of copper contacts 386, each having an electrical contact 388 at one end thereof, are mounted on base 356 with each of contacts 388 in position for engaging one of contacts 384 of plate 382.

Counterweight 378 is adjusted so that, when there is no snow or other load on the top of disc 362, balance beam 358 will pivot counterclockwise (as viewed in FIG. 23) and contacts 388, 384 will be in electrical contact. When a snow load exceeding the predetermined level builds up on disc 362 (a total load of about 1 pound per square foot), the downward movement of the disc rotates beam 358 counterclockwise, breaking the electrical contact. Excessive downward movement of disc 362 is prevented by a stop 390 in base 356 arranged to engage the bottom of beam 358 just below shaft 368.

FIG. 25 schematically illustrates the control system connecting detector 350 to the insulating system of FIGS. 1–15. As shown, a timer 400, the switch 402 of snow detection system 350 (comprising contacts 384, 388) and a solenoid 404 are connected in series. Timer 400 has a 24 hour cycle and controls two switches 400-1 and 400-2. The timer is set so that, during the day, switch 400-1 will be open and switch 400-2 will be closed. At night, the position of the switches is reversed; switch 400-1 is closed and 400-2 is open. The snow detection switch 402 is closed whenever the snow load is less than the predetermined level. Solenoid 404 is arranged to close terminal pairs 404-1 through 404-3 when it is energized, and to close terminal pairs 404-4 through 404-6 when it is not energized. Forward limit switch 408 is open when the insulating system is fully extended, and is otherwise closed. Rear switch 410 is open when the insulating fabric 60 is fully withdrawn and wrapped around roll 30 and is otherwise closed. Timer 400 is also connected in series with light 360 of detection system 350, so that the light will burn during the day.

As will be apparent, fabric 60' will be moved, by motor 1, into its insulating position whenever timer 400 and snow load switch 402 (and, because the fabric is not fully extended, forward limit switch 408) are closed. When the fabric moves into its fully extended position, it opens forward limit switch 408, stopping further forward movement.

The fabric will be moved away from its insulating position, e.g., wrapped around roll 30', whenever solenoid 404 is de-energized. Solenoid 404 is de-energized during the day, when timer 404 is open, when the snow-ice load reaches the predetermined detection level, opening snow detection switch 402, or whenever there is any electrical failure. The fabric will continue to move into its storage position until it engages and trips rear limit switch 410.

As is apparent, snow/ice detection system is useful with a wide variety of structures, and may be used in a number of different ways. In addition to glass greenhouses, it is also useful to warn of dangerous build-up on large inflated plastic greenhouses and other structures, such as covered tennis courts. When used with such structures, the detection system may be arranged, not only to actuate control systems such as those previously disclosed and discussed hereinafter, but also to sound an alarm, raise the thermostat controlling the temperature of the interior of the structure, turn-on an auxiliary furnace, or deflate the plastic envelope forming the structure wall (which envelope itself is supported in position by a steel frame) so that heat from the interior of the structure will more quickly melt whatever has collected on the outside.

FIGS. 26 and 27 illustrate a further type of insulating system, generally designated 500, with which snow/ice detection system 350 is useful. As shown, a system 500 is mounted on the outside of each sloped roof of a greenhouse 502. Each system 500 includes a pair of 3 inch perforated pipes 504, 506 extending the full length of the greenhouse parallel to the peak of the roof. Pipe 504 is mounted just below the vent windows 508 near the roof peak; pipe 506 is mounted just below the eaves. Both of pipes 504, 506 are mounted just within an envelope 510 of plastic sheeting. Envelope 510 extends the full length of the greenhouse and is completely sealed except for an inlet duct 512 and a return duct 516. As shown, inlet duct 512 extends from pipe 504 to the outlet of squirrel cage fan 514 mounted within greenhouse through duct 512 and pipe 504 into envelope 510. Return duct 516 extends from pipe 506 through the greenhouse side wall into the greenhouse, and includes an adjustable orifice 520 at its inner end for regulating flow of air from the envelope 510 to within the greenhouse. For heating air forced by fan 514 into envelope 510, a resistance heating element 518 is mounted in inlet duct 512. It should be noted that the openings spaced along the length of each of ducts 512 and 516 facilitate flow of air from within the plastic envelope when the envelope is being deflated.

FIGS. 28 and 29 illustrate control systems, both including detection systems 350, for use with insulating system 500. In the control system of FIG. 28, fans 514 are normally on and are connected in series with snow detection system switch 402. If the load sensed by snow/ice detection 350 should exceed the predetermined level, snow detection switch 402 will open, turning off the fans. With the fans off, the envelopes 510 will deflate, and heat from within the greenhouse will melt the accumulated snow or ice on the envelopes. A reset control switch 522 is mounted in series with snow detection system light 360 and is arranged to turn on the light for a predetermined period, normally about two hours, when the control switch is pressed. Light 360 is normally off, and normally is turned on only to melt the snow or ice on detector disc 362 and thus reset the detection system. It should be noted that control systems of this type permit heating unit 518 to be omitted and may be used with inflatable structures such as the greenhouse and covered tennis courts.

The control system of FIG. 29 is most useful with insulating systems 500 in which it is desirable for fans 514 to run continuously. It may also be used, for example, to provide for the flow of heated air into inflatable greenhouses during periods of snow or ice build-up. A solenoid 526 connected in series with snow detection system switch 402 controls a normally closed switch 526-1 in series with heater unit 518. When solenoid 526 is actuated, e.g., whenever snow detection switch 402 is closed, switch 526-1 is open. As will be apparent, solenoid 526 will become deactivated (thus permitting switch 526-1 to move to its normally closed position, turning on heater 518 and causing hot air to flow into envelopes 510 and melt any snow or ice build-up thereon) whenever build-up in snow detection unit 350 opens switch 402. A reset control switch 524, substantially identical to reset control switch 522 of the system of FIG. 28, is connected in series with snow detection system light 360 for turning on the light to melt ice or snow build-up and reset the detection system.

Other embodiments of the present invention will be within the scope of the following claims.

What is claimed is:

1. In a greenhouse having a roof, a pair of spaced transverse end walls, and a pair of spaced longitudinally extending side walls, a system for reducing heat loss through the roof during one part of a day and for permitting sunlight to pass through the roof to a growing area within the greenhouse during a second portion of the day, said system comprising:

a flexible sheet of insulating material mounted within the greenhouse and arranged for movement between a storage position in which the sheet is stowed along a longitudinal side of said growing area and permits sunlight to pass through the roof to the growing area, and an insulating position in which the sheet is deployed in a generally horizontal plane extending across the growing area between the growing area and the roof;

support means engaging the sheet at spaced intervals along its length and supporting the sheet in the storage and insulating positions;

deploying means for moving the sheet from its storage to its insulating position;

retracting means for moving the sheet from its insulating to its storage position;

means providing a seal between each of the opposite longitudinal edges of the sheet and the most adjacent side wall of the greenhouse when the sheet is in its insulating position, said sheet and said means providing a seal substantially preventing heat loss from below said sheet to above said sheet when said sheet is in said insulating position; and, control means operatively connected to and controlling said deploying means and said retracting means, said control means including a snow-ice detection system for detecting the build-up of non-liquid precipitation and having a generally planar, imperforate, horizontal, upwardly-facing accumulation surface arranged to retain non-liquid precipitation incident thereupon and to permit liquid precipitation to spill over the edges thereof, and said control means being responsive to build-up of non-liquid precipitation on said accumulation surface to prevent said deploying means from moving said sheet towards said insulating position and to cause said retracting means to move said sheet towards said storage position when the weight of said build-up exceeds a predetermined level.

2. The system of claim 1 including further sealing means extending from each end of said longitudinal side of said growing area generally perpendicularly to said side across said area to the opposite longitudinal side thereof, said further sealing means being arranged to sealingly engage the transverse edges of said sheet when said sheet is in said insulating position.

3. The system of claim 1 wherein said sheet comprises a plurality of panels of equal width each having one end thereof secured adjacent one longitudinal side of said growing area and the sides thereof extending generally across said area when said sheet is in said insulating position, adjacent sides of said panels being sealed to each other.

4. The system of claim 1 including heating means for selectively heating said accumulation surface to prevent build-up of snow and ice on said surface during said one part of a day and to permit said build-up during said second portion of the day.

5. The system of claim 1 wherein said support means includes a plurality of overhead supports each extending from adjacent said longitudinal side above said generally horizontal plane and across said growing area, and a plurality of connectors each secured to said sheet and engaging a respective one of said overhead supports.

6. The system of claim 5 wherein each of said overhead supports defines a pair of upwardly-facing support surfaces, and each of said connectors includes a post extending generally vertically upwardly from said sheet and a pair of rollers, each of said pair of rollers engaging one of said pair of surfaces.

7. The system of claim 1 wherein said snow-ice detection system includes a member vertically movable between first and second positions and defining said accumulation surface, said member being biased vertically upwardly towards said first position with a predetermined force and being movable downwardly towards said second position in response to build-up on said accumulation surface of mass having a weight greater than said predetermined force, and said control means is responsive to downward movement of said member from said first position.

8. The system of claim 7 wherein said detection system comprises a support, a beam mounted generally horizontally for limited pivotal movement about a horizontal axis relative to said support, one end of said beam being connected to said member, an electrical contact connected to the other end of said beam, and a second electrical contact mounted on said support, said contacts being arranged to engage each other when said member is in said first position and to be disengaged from each other when said member moves from said first position towards said second position.

9. The system of claim 1 wherein said greenhouse includes therein a plurality of bays, a said sheet is associated with each of said bays and is arranged to be stowed along a side of said each bay in the storage position thereof and to extend over said bay in the insulating position thereof, and said system includes means sealing adjacent longitudinal edges of respective pairs of said sheets to each other and the longitudinal edges of said sheets most adjacent said side walls to said side walls when said sheets are in their insulating positions.

10. The system of claim 9 wherein each said sheet extends substantially the entire length of a respective said bay.

* * * * *

UNITED STATES PATENT AND TRADEMARK OFFICE
CERTIFICATE OF CORRECTION

PATENT NO. : 4,064,648
DATED : December 27, 1977
INVENTOR(S) : Charles C. Cary

It is certified that error appears in the above-identified patent and that said Letters Patent are hereby corrected as shown below:

Column 2, line 24, after "its", insert --first--;

Column 2, line 50, "means" is misspelled;

Column 3, line 59, "rool" should be --roof--;

Column 5, line 22, after "wall", insert --11--;

Column 6, line 13, "plate 135" should be --plate 134--;

THE FOLLOWING APPLYS TO THE GRANT ONLY:

The attached Columns 9-12 should be inserted after Column 8, respectively.

Signed and Sealed this

Twenty-seventh Day of June 1978

[SEAL]

Attest:

RUTH C. MASON
Attesting Officer

DONALD W. BANNER
Commissioner of Patents and Trademarks adjacent pairs of support posts 22 and a sheet of flexible rubber 204 having one longitudinal edge portion thereof secured to block 202 in the other edge thereof 206 wiping the exterior of roll 30 with the fabric 60 rolled thereupon.

Similar insulating structure is provided between bays 26 and 27, and between bays 27 and 28 of the greenhouse 10 of FIG. 1. The insulating structure between bays 26 and 27 comprises insulating blocks 202 extending between adjacent pairs of posts 22, with one longitudinally extending side edge of the block closely adjacent the shaft 160 in bay 26 and the edge 206 of the rubber sheet wiping the roller 30 in bay 27. The structure between bays 27 and 28 is similar.

Reference is now made to FIGS. 13 and 14 illustrating the manner in which the trailing longitudinal edge 88 of fabric 60 (comprising panel ends 61) is secured to roll 30. As shown, a outwardly convex backing strip 208 is positioned over the longitudinally extending trailing edge portion 88 of fabric 60. Strip 208 extends the full length of roll 30 (either as a single piece or as sections placed end-to-end), with its longitudinally extending edges engaging the outer surface of fabric 60. Rivets 210 spaced at regular intervals along the strip pass through the strip into and through the periphery of roll 30, pulling the strip tightly against the roll and holding fabric 60 tightly in place between the roll and backing strip.

FIG. 15 illustrates in somewhat more detail the manner in which straps 78 and 174 are attached to pulleys 170. As shown, a portion of the base 212 of the groove 172 of pulley 170 is removed to provide a pair of flats 214, 216 spaced radially inwardly from base 212. The distance the flats are recessed is such that the heads of set screws 179 will not project beyond the diameter of base 212. A rectangular in cross section slot 218 extends diagonally into the body of the wheel from flat 214 generally parallel to flap 216. The leading end of strip 78 (or of a strip 174) passes over major portion of flat 214 and is inserted into slot 218. Set screws 179 pass from slots 216 and 214 through the strap and hold it in place. The strap is then wrapped around pulley 170 several times thereby preventing excessive stress at its points of connection to the pulley.

FIGS. 16 and 17 illustrate the manner in which the insulation system of the present invention is supported in a greenhouse, generally designated 10' of overhead trust construction. The system of FIG. 16 is essentially the same as that previously discussed and similar portions thereof are identified by the same references numerals with a differentiating prime (') added thereto. As shown, roll 30' is mounted at one longitudinal wall 16 of the greenhouse and takeup structure 160' on the opposite wall. To support the fabric 60' when it is extended between the two walls, a plurality of post supports, generally designated 220, are spaced at intervals along the center line of the greenhouse. As shown most clearly in FIG. 17, each post support 220 includes an upright pole 222 with a tee 224 at the top thereof and rollers 226 projecting outwardly from opposite sides of tee 224 generally parallel to the peak of the greenhouse. Each roller 226 is mounted for rotation about its axis, and engages the underside of fabric 60'.

Further to prevent the fabric 60 from sagging, it is often desirable to provide an overhead guide system, such as that generally designated 228 in FIG. 17. Similar guide systems to that shown may be used in insulating systems such as that of FIGS. 1-15, and typically will be used when the bay becomes relatively great. As shown in FIG. 17, guide system 228 includes a support channel 230 extending transversely the width of greenhouse (or, in the system of FIGS. 1-15, the width of a greenhouse bay) above fabric 60' and aligned with a strap 174 and pulley 170. A T-shaped support, including a vertical post 232 secured at its lower end to the leading edge 66' of fabric 60' adjacent the fabric and rubber flap 70', and a pair of horizontal rollers 234 secured to the upper end of the post, extends upwardly from the fabric into channel 230. As shown, a pair of inturned lips 238 at the bottom of channel 230 form a slot into which support 232 extends and a pair of upwardly facing surfaces on which rollers 234 roll.

FIGS. 18 and 19 illustrate a further modification of the insulation system of the present invention mounted in a greenhouse 10" of modified truss construction. As before, portions of the system of FIGS. 18 and 19 are identified by the same numbers as corresponding portions of the system previously discussed, with a differentiating double prime (") added thereto. As shown in FIG. 18, greenhouse 10" includes support posts 22 extending down the center and spaced along the side walls 16" of the greenhouse, a roll 30" carrying insulating fabric 60" mounted on each side of the center row of posts 22', and a take-up system mounted along each side wall.

The take-up system, shown most clearly in FIG. 19 includes a take-up shaft 160" and pulleys 170' mounted on support brackets 162" attached to the posts 22" adjacent each of the greenhouse longitudinal side walls 16". An overhead support system 228" similar to that already described with reference to FIGS. 16 and 17 is provided to prevent sag of the extended fabric.

Insulating fabric 60' includes a pair of superposed fabric sheets 242, 244. The leading edges of sheets, 242 244, adjacent flap 70", are spaced apart by a space block 246 extending the full length of the leading edge. A male coupling 248 is secured to the lower fabric sheet 224 adjacent the leading thereof and extends downwardly from sheet 244. As shown, coupling 248 is generally circular in cross section and includes a central bore 250 permitting flow of air into and from the space between the superposed fabric sheets, and an annular groove 252 in its outer periphery. A fan 254 having an outlet nozzle 256 is mounted on support 162" below shaft 160". A female coupling 258 is mounted on nozzle 256 above shaft 160" in position for engaging male coupling 248 when the fabric 60" is drawn into its insulating position. Female coupling 258 includes an upwardly facing channel 260 having a pair of opposed flanges 262 arranged to slide into annular groove 252 of male coupling 248. The base 264 of channel 260 is curved downwardly toward the center of the greenhouse to provide a camming action as it engages the bottom of the surface of male coupling 252. When male coupling 248 is drawn fully into female coupling 258, bore 250 in coupling 248 is coaxially aligned with a bore 266 extending through female coupling 258 into communication with fan nozzle 256. Typically, fan 254 is rated at about 2 inches water pressure at a delivery rate of 250 cfm.

Reference is now made to FIGS. 20–22 illustrating an insulating system of the present invention, generally designated 300 used to reduce nighttime heat loss through large vertical glass wall 302 of, for example, a modern bank building. As shown, insulating system 300 includes a roll 304, around which is wrapped a sheet of insulating fabric 306, mounted for rotation above window 302 with its axis substantially horizontal and parallel to the upper edge of the winder. The construction of roll 304 and the manner in which it is attached to fabric 306 is substantially identical to that previously discussed with reference to the embodiment of FIGS. 1-15. To support the roll of fabric in position, a plurality of supports 308, shown most clearly in FIGS. 21-22, are spaced along the length of the roll and attached to reinforced concrete lip 310 at the top of window. Each support 308 includes a backplate 312 attached to concrete 310, a pair of side plates 314 extending perpendicularly outwardly from plate 312 and spaced slightly apart from each other, and five rollers 316 mounted between side plates 314 with their axes parallel to that of roll 304.

Side plates 314 are identical. Each includes a large generally circular opening 318 in the center thereof to receive the roll 304 of fabric and an opening 320 extending vertically downwardly from circular opening 318, generally, tangent to the side of opening opposite backplate 312, to the bottom of the sideplate. A belt 322 is entrained around rollers 316 to provide a surface of relatively large area engaging the fabric 306 wrapped around roll 304.

The arrangement of rolls 316 relative to roll 304 is shown most clearly in FIG. 21. As shown, the pair roll 316 adjacent backplate 312, one near the top of the plate, the other near the bottom and slightly below opening 318, act as belt return rollers. The other three rollers support the portions of belt 322 engaging the roll 304; one mounted adjacent and on each side of opening 320 and the third on the diametrically opposite side of opening 318. When the roll 304 with fabric 306 wrapped therearound is mounted on belts 322 in supports 308, the leading edge of the fabric extends downwardly through opening 320.

For asthetic purposes, the support structures 308 and roll 304 of system 300 are covered by a longitudinally-extending generally trapezoidal in cross-section cap 324 of sheet metal. Cap 324, as shown in cross section in FIG. 21, includes a longitudinal opening extending its full length in the bottom thereof and mating with the openings 320 of supports 308.

The bottom, e.g., leading, edge of fabric 306 is stitched back upon itself to form a pocket 326 in which is mounted a lead or other metal bar of sufficient weight to keep the fabric fully extended. To move the fabric between its extended (insulating) and retracted (storage) positions, a drive system generally designated 328 is provided adjacent one end of roll 304. As shown, the drive system comprises a reversible braked motor connected by a drive chain to a drive shaft at the end of the roll. When the motor rotates roll 304 in one direction the fabric is unwound from the roll and, pulled by weight 326, moves downwardly over the inner surface of window 302. To retract the fabric into its storage position, the motor is simply reversed.

Further modifications may be made in the above-described invention. For example, a direct drive motor may be mounted on one end of the take-up shaft, when space permits, in lieu of the drive belt system shown in FIG. 5. Similarly, the roll of insulating fabric may be biased towards its storage position by a counterweight attached to the roll, in lieu of the internal helical spring system shown in FIG. 13. If the insulating sheet and the design of installation are such that edge sag is not a serious problem the sets 88 of FIGS. 6 and 7 may be omitted. Fewer rollers may be used to support the roll of insulating material and, if the material is of sufficient strength, the rollers themselves may engage it thereby permitting elimination of the entrained supporting belt.

Additional modifications may be made in the insulating sheet and in the structure used to deploy it. One principal such modification, shown in FIGS. 30-31, insures that the tension exerted on the insulating sheet is constant across the full length and width of the sheet. The system there shown is a modification of that previously discussed with reference to FIGS. 1-15, and corresponding portions are identified by the same reference numerals, with a differentiating suffix "a" added thereto. Thus, for example, the greenhouse in FIGS. 30-31 is generally designated 10a, whereas that of FIGS. 1-15 was designated 10.

Referring more particularly to FIGS. 30-31, roll 30a around which insulating sheet 60a is wrapped is mounted for rotation on greenhouse support posts 22a along greenhouse side wall 16a by support structures 90a 100a and 110a. Take-up shaft 160a is mounted on supports 162a on the posts 22a along the opposite side of bay 26a. Take-up wheels 170a are keyed to shaft 160a.

A pulley 420 is mounted, with its axis of rotation perpendicular to the plane of sheet 60a, adjacent each corner of the leading edge of the sheet and in alignment with the end ones of take-up wheels 170a. Pairs of pulleys 422 are mounted along the sheet leading edge with the center of each pair aligned with an intermediate one of take-up wheels 170a. A cable 424, attached at its ends to the end ones of take-up wheels 170a, extends from take-up shaft 160a to sheet leading edge 65a along the leading edge through all of pulleys 420, 422. Cables 426 attached to the intermediate ones of take-up wheels 170a extend from the take-up wheels to each of pulleys 422, and a pulley 428 is attached to the end of each of cables 426. Cable 424 is threaded through pulleys 428, with each of pulleys 428 intermediate a pair of pulleys 422. When shaft 160a is rotated to draw sheet 60a across a bay, it will be seen that the tension on each of pulleys 422 attached to the sheet leading edge will be substantially the same, regardless of minor variations in cable, wheel and pulley size or alignment.

When, as in this modification, cables are used in lieu of the flat steel straps previously discussed with reference to FIGS. 1-15, it may be convenient for the take-up wheels to have helical grooves cut therearound to insure proper wrapping of the cables. It may also be desirable, whether using cables or flat steel strips, to provide a hollow pipe at the leading edge of the insulating sheet to decrease sagging.

The insulating sheet itself may comprise any of wide range of materials. The choice will depend on among other things, cost and the insulating factor required. When, as in the illustrated embodiments, the inner surface of the sheet is coated or faced with a reflective material, the insulating factor of the sheet is far greater than if the surface is unfaced. For example, the insulating resistance of a single layer of full reflective faced material is almost as great as that of two layers unfaced material with an insulating space therebetween.

When using multiple layers it may be desirable place foam strips or spacers between the layers to space them apart when the insulating sheet is extended, in li of the inflating system shown in FIGS. 18 and 19. often will also be desirable for the insulating sheet comprise a single sheet of organic plastic sheet materi in lieu of multiple fabric panels sewn together. Wh plastic material is used, either as a single sheet or a